US007245329B2

(12) United States Patent
Tanaka et al.

(10) Patent No.: US 7,245,329 B2
(45) Date of Patent: Jul. 17, 2007

(54) SUBSTRATE FOR A LIQUID CRYSTAL DISPLAY DEVICE COMPRISING SECOND THIN-FILM TRANSISTORS FOR APPLYING A VOLTAGE TO PIXEL ELECTRODES FOR POLYMERIZING THE MONOMER

(75) Inventors: Yoshinori Tanaka, Kawasaki (JP); Yoji Taniguchi, Kawasaki (JP); Yoji Nagase, Kawasaki (JP); Tomoyuki Miyata, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 20 days.

(21) Appl. No.: 10/310,125

(22) Filed: Dec. 4, 2002

(65) Prior Publication Data
US 2003/0112384 A1    Jun. 19, 2003

(30) Foreign Application Priority Data
Dec. 13, 2001 (JP) ............................. 2001-379531

(51) Int. Cl.
*G02F 1/136* (2006.01)
(52) U.S. Cl. ..................... 349/43; 349/88; 349/149
(58) Field of Classification Search .................. 349/93, 349/141–152, 40, 139, 86, 88, 43, 42, 178
See application file for complete search history.

(56) References Cited
U.S. PATENT DOCUMENTS
4,938,568 A * 7/1990 Margerum et al. ........... 349/201

| 6,043,971 A * | 3/2000 | Song et al. ................. 361/111 |
| 6,049,368 A * | 4/2000 | Song .......................... 349/139 |
| 6,630,975 B1 | 10/2003 | Terashita .................... 349/139 |
| 6,847,418 B2 * | 1/2005 | Park .......................... 349/88 |
| 2001/0006410 A1 | 7/2001 | Yamada et al. ............. 349/178 |

FOREIGN PATENT DOCUMENTS

| JP | 07-333275 | 12/1995 |
| JP | 11-072793 | 3/1999 |
| JP | 11-149092 | 6/1999 |
| JP | 2000-250045 | 9/2000 |
| JP | 2001-264770 | 9/2001 |

* cited by examiner

*Primary Examiner*—Thoi V. Duong
(74) *Attorney, Agent, or Firm*—Greer, Burns & Crain, Ltd.

(57) ABSTRACT

A substrate for a liquid crystal display device comprises a TFT substrate for holding opposing substrates arranged opposed to each other as well as a liquid crystal composition obtained by mixing a monomer into liquid crystals. A plurality of bus lines are formed on the TFT substrate intersecting each other through an insulating film, and thin-film transistors are formed close to positions where the plurality of bus lines and intersect each other. A plurality of thin-film transistors for polymerization are formed for applying a voltage to the pixel electrodes at the time of polymerizing the monomer, and a first common electrode wiring for polymerization is electrically connected to the gate electrodes of the plurality of thin-film transistors for polymerization.

6 Claims, 19 Drawing Sheets

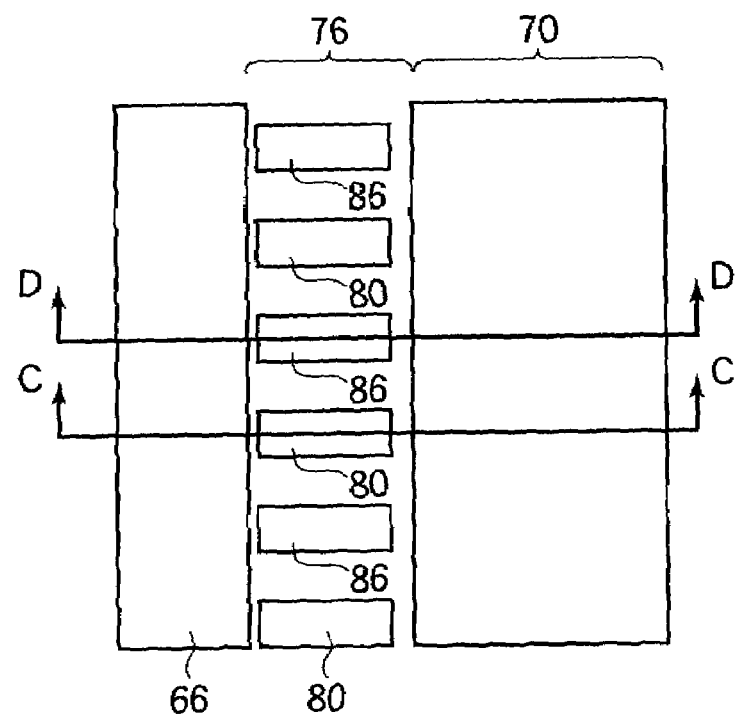
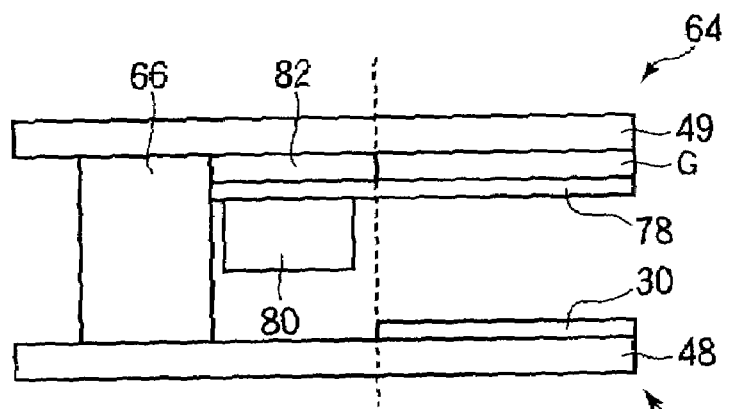
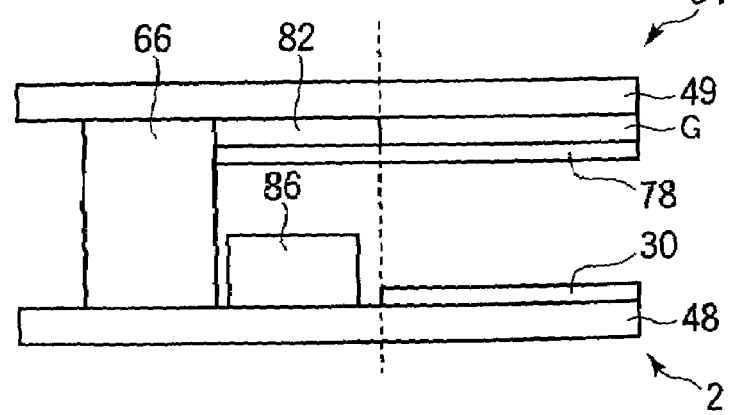

SUBSTRATE FOR A LIQUID CRYSTAL DISPLAY DEVICE COMPRISING SECOND THIN-FILM TRANSISTORS FOR APPLYING A VOLTAGE TO PIXEL ELECTRODES FOR POLYMERIZING THE MONOMER

BACKGROUND OF THE INVENTION

1. Field of the Invention

This invention relates to a substrate for a liquid crystal display device that constitutes a display device such as information equipment and the like, and to a liquid crystal display device equipped with the same.

2. Description of the Related Art

There has heretofore been known a liquid crystal display device of an MVA mode (multi-domain vertical alignment mode) by vertically aligning liquid crystals having a negative dielectric anisotropy and having a bank structure (linear protuberance) and a slit of electrode on a substrate as an alignment regulating structure. Being provided with an alignment regulating structure, it is allowed to control the alignment of liquid crystals in a plurality of directions of when a voltage is applied even without rubbing the alignment film. The liquid crystal display device of the MVA mode is superior in viewing angle characteristics to the liquid crystal display devices of the conventional TN (twisted nematic) mode.

Another method of regulating the alignment of the liquid crystal molecules may be a polymer fixing system. According to the polymer fixing system, a liquid crystal composition obtained by adding a trace amount of a monomer that polymerizes upon the irradiation with ultraviolet rays (UV) to the liquid crystals having a negative dielectric anisotropy, is sealed between two pieces of substrates having vertically alignment films formed on the surfaces thereof facing each other. Thereafter, a predetermined voltage is applied across the substrates to tilt the liquid crystal molecules which are, then, irradiated with UV to polymerize the monomer.

FIG. 18 is a view schematically illustrating a state of a liquid crystal composition in which the monomer is polymerized. As shown in FIG. 18, electrodes 114 and 115 are formed on the opposing surfaces of two pieces of glass substrates 112 and 113. Vertically alignment films 116 and 117 are formed on the electrodes 114 and 115.

A liquid crystal layer 118 between the two substrates is constituted by liquid crystal molecules 102 aligned nearly vertically to the surfaces of the substrates and polymer structures 106 formed by the polymerization of monomers 104 that are tilted at a given pre-tilted angle. The polymer structures 106 are formed as the liquid crystal layer 118 is irradiated with UV in a state where a predetermined voltage is applied across the electrodes 114 and 115 from a power source 140 through a switch 142. Since the polymer structures 106 are fixed at a given pre-tilted angle with respect to the surfaces of the substrates, the surrounding liquid crystal molecules 102 are caused to be tilted in a predetermined direction. Therefore, the liquid crystal display device of the MVA mode based on the polymer fixing system does not require an alignment regulating structure that was so far used for forming a multiplicity of domains and, hence, offers an advantage of simplifying the production process.

Further, the polymerized liquid crystal molecules have a lower threshold voltage than that of other liquid crystal molecules (host liquid crystals), and respond quicker than the other liquid crystal molecules when driven on a low gray level; i.e., the response time of the liquid crystal molecules is improved on a low gray level.

According to the polymer fixing system, the liquid crystal layer 118 must be irradiated with UV while being applied with a predetermined voltage to impart a given pre-tilted angle. In order to apply a voltage to the liquid crystal layer 118, a predetermined voltage (gray-level signal) must be applied to the data bus line and another predetermined voltage must be applied to the gate bus line to turn on the thin-film transistors (TFTs) of the pixels.

The voltages are applied to the bus lines usually by a probing method or a method which utilizes a peripheral connection line (common wiring). The former method uses a contact prober or the like to probe terminals of bus lines which are electrically independent from each other to apply a predetermined voltage thereto. The latter method applies a voltage by using the peripheral connection line that has been electrically connected to a plurality of bus lines.

FIG. 19 illustrates a state where a voltage is applied to the bus lines 120 by probing. As shown in FIG. 19, a contact prober (not shown) has a plurality of probing pins 122 that are brought into contact with the terminals 124 of the bus lines 120 to apply a predetermined voltage to the bus lines 120.

As the wiring patterns are highly finely formed in recent years, however, the gap P among the bus lines 120 is becoming narrow making it difficult to conduct the probing. Further, the number of the required probing pins 122 increases with an increase in the number of the bus lines 120, and it is becoming more difficult to reliably bring all of the probing pins 122 into contact with the terminals 124.

In FIG. 19, the third probing pin 122' from the left is not in contact with the terminal 124'. Without reliably effecting the probing, the predetermined voltage is not applied to the pixels on the bus line 120' connected to the terminal 124', and the liquid crystal molecules 102 are not controlled for their pre-tilted angles to a sufficient degree by the polymer fixing system. Therefore, the defective display (linear defect) occurs on the bus line 120' deteriorating the quality of display.

FIG. 20 illustrates a constitution of a peripheral connection line used for applying a voltage. As shown in FIG. 20, the terminals 124 of the bus lines 120 are electrically connected together through a peripheral connection line 126. A pad 128 for applying voltage is electrically connected to the peripheral connection line 126. Upon bringing a probing pin (not shown in FIG. 20) into contact with the pad 128 for applying voltage, a predetermined voltage is applied to a plurality of bus lines 120.

However, the bus lines 120 which are electrically connected together must be electrically separated from each other in a step after the steps of producing a panel. Therefore, an extra step is necessary for either effecting the secondary scribing to cut the glass substrate along a dot-dash chain line α or cutting, by a laser, the wiring between the peripheral connection line 126 and the terminals 124 along the dot-dash chain line α, arousing a problem of an increase in the cost of production.

SUMMARY OF THE INVENTION

The present invention, therefore, provides a substrate for a liquid crystal display device capable of offering a display of good quality and a liquid crystal display device equipped therewith at a low cost of production.

The substrate for a liquid crystal display device provided by the invention comprises a holding substrate for holding a liquid crystal composition obtained by mixing a monomer into liquid crystals with opposite substrate, a plurality of bus lines formed on the holding substrate in a manner of intersecting each other through an insulating film, a pixel electrode formed for each of the pixel regions sectionalized by the plurality of bus lines, thin-film transistors formed close to positions where the plurality of bus lines intersect each other, a plurality of thin-film transistors for polymerization formed for applying a voltage to the pixel electrodes at the time of polymerizing the monomer, and a first common electrode wiring for polymerization electrically connected to the gate electrodes of the plurality of thin-film transistors for polymerization.

BRIEF DESCRIPTION OF THE DRAWINGS

FIGS. 15A to 15C are views illustrating the constitution of the liquid crystal display device according to an Example 2-2 of the second embodiment of the invention;

DESCRIPTION OF THE PREFERRED EMBODIMENTS

First Embodiment

A substrate for a liquid crystal display device and a liquid crystal display device equipped therewith according to a first embodiment of the invention will now be described with reference to FIGS. 1 to 6. In this embodiment, a plurality of bus lines are electrically connected only at a moment when a monomer mixed into liquid crystals is polymerized by using TFTs for polymerization and a common electrode wiring for polymerization electrically connected to the gate electrodes of the TFTs for polymerization. The substrate for a liquid crystal display device and the liquid crystal display device equipped therewith according to the embodiment will now be concretely described by way of Examples 1-1 and 1-2.

EXAMPLE 1-1

Figure 1:
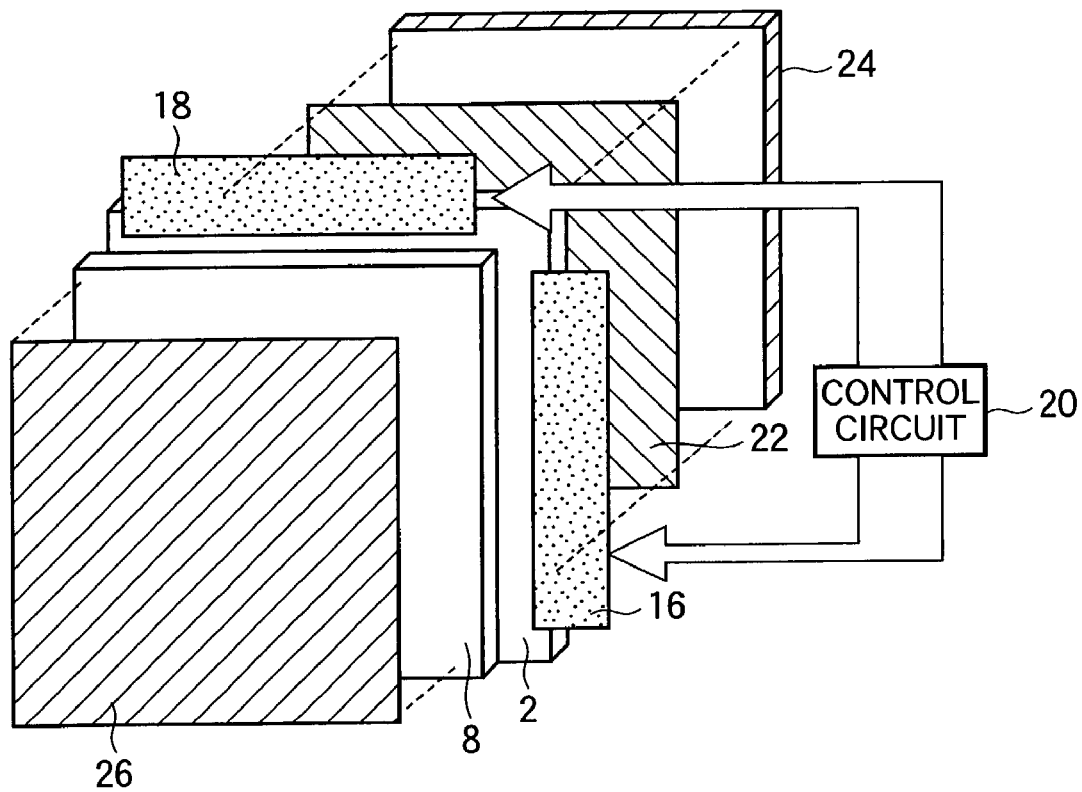
FIG. 1 is a view illustrating the constitution of a liquid crystal display device according to an Example 1-1 of a first embodiment of the invention.

First, the substrate for the liquid crystal display device and the liquid crystal display device equipped therewith according to an Example 1-1 will be described with reference to FIGS. 1 to 4. FIG. 1 is a view schematically illustrating the constitution of a liquid crystal display device according to this Example. The liquid crystal display device has a structure in which a TFT substrate 2 having TFTs formed thereon and a CF substrate 8 having a color filter (CF) or the like formed thereon are stuck being opposed to each other, and a liquid crystal composition which is a mixture of liquid crystals and a monomer is sealed in between.

Figure 2:
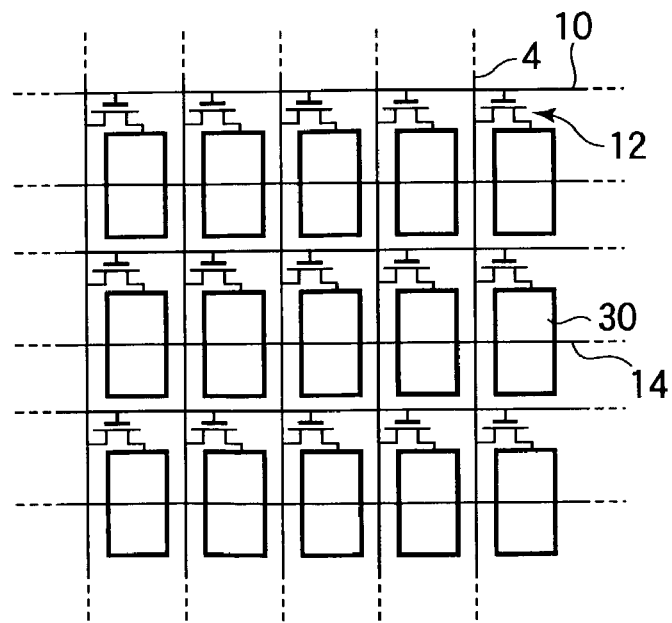
FIG. 2 is a view illustrating the constitution of a substrate for a liquid crystal display device according to the Example 1-1 of the first embodiment of the invention.

FIG. 2 is a view of an equivalent circuit of elements formed on the TFT substrate (holding substrate) 2. On the TFT substrate 2, there are formed a plurality of gate bus lines 10 extending in the right-and-left direction in the drawing and in parallel with each other. There are further arranged a plurality of data bus lines 4 extending in the up-and-down direction in the drawing and in parallel with each other nearly at right angles with the gate bus lines 10 through an insulating film which is not shown. The regions surrounded by the plurality of gate bus lines 10 and by the plurality of data bus lines 4 serve as pixel regions on the side of the TFT substrate 2. A TFT 12 and a pixel electrode 30 are formed in each pixel region. Each TFT 12 has a drain electrode connected to a neighboring data bus line 4, a gate electrode connected to a neighboring gate bus line 10, and a source electrode connected to the pixel electrode 30. Storage capacity bus lines 14 are formed through nearly the centers of the pixel regions in parallel with the gate bus lines 10. The TFTs 12, pixel electrodes 30, and bus lines 4, 10, 14 are formed through the steps of photolithography by repeating a series of semiconductor processes, i.e., "formation of film→application of resist→exposure to light→developing→etching→peeling of resist".

Though not illustrated, a light-shielding film (BM) is formed on the CF substrate 8 for sectionalizing the pixel regions on the side of the CF substrate 8. Further, any one of CF resin layer R, G or B is formed on the pixel regions on the side of the CF substrate 8.

Reverting to FIG. 1, on the TFT substrate 2 facing the CF substrate 8 with the liquid crystals sealed in between, there are provided a gate drive circuit 16 mounting a driver IC for driving the plurality of gate bus lines 10 and a drain drive circuit 18 mounting a driver IC for driving the plurality of data bus lines 4. In response to predetermined signals from a control circuit 20, these drive circuits 16 and 18 send scanning signals and data signals to predetermined gate bus lines 10 and data bus lines 4. A polarizing plate 22 is arranged on the surface of the TFT substrate 2 of the side opposite to the element-forming surface thereof, and a back-light unit 24 is mounted on the surface of the TFT substrate 2 on the side opposite to the polarizing plate 22. A polarizing plate 26 arranged in cross-nicol relationship to the polarizing plate 22, is stuck to the surface of the CF substrate 8 on the side opposite to the CF-forming surface.

Figure 3:
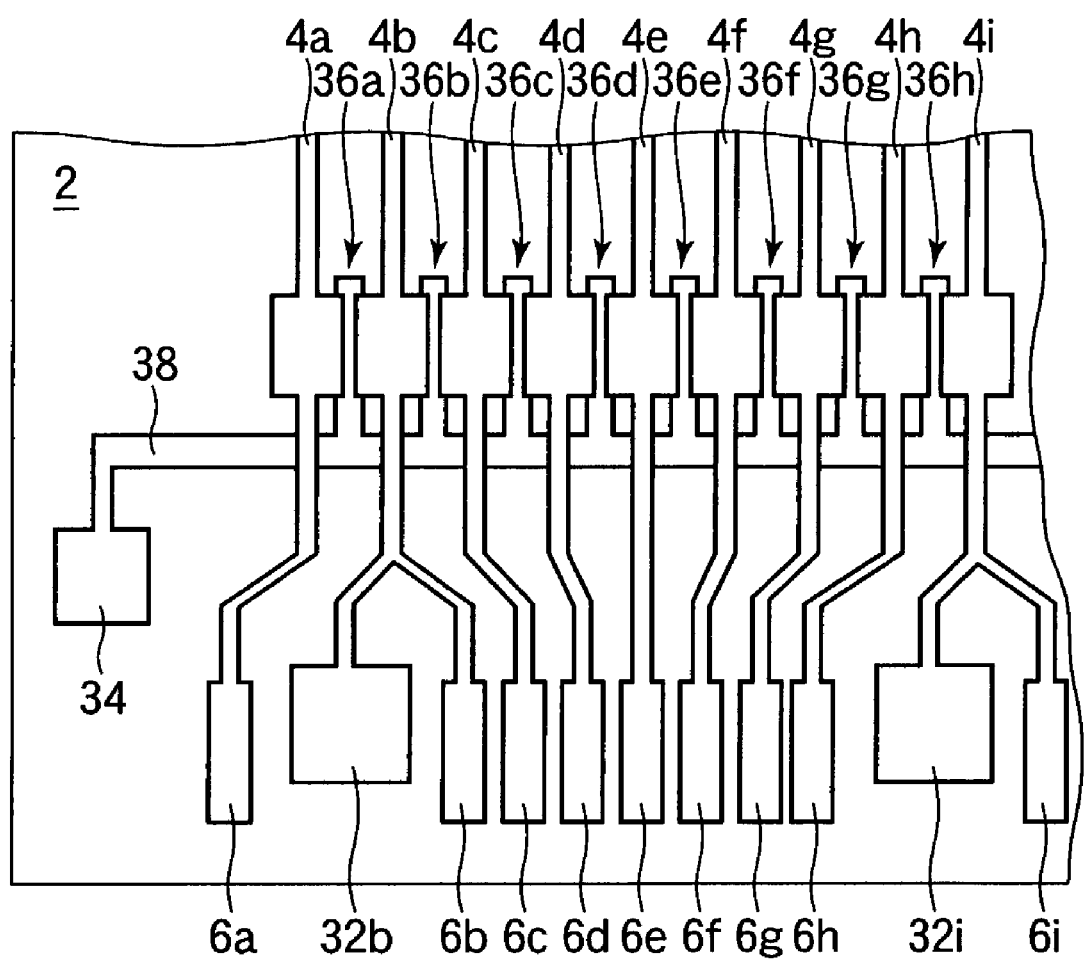
FIG. 3 is a view illustrating the constitution of an end portion of the substrate for a liquid crystal display device according to the Example 1-1 of the first embodiment of the invention.
Figure 4:
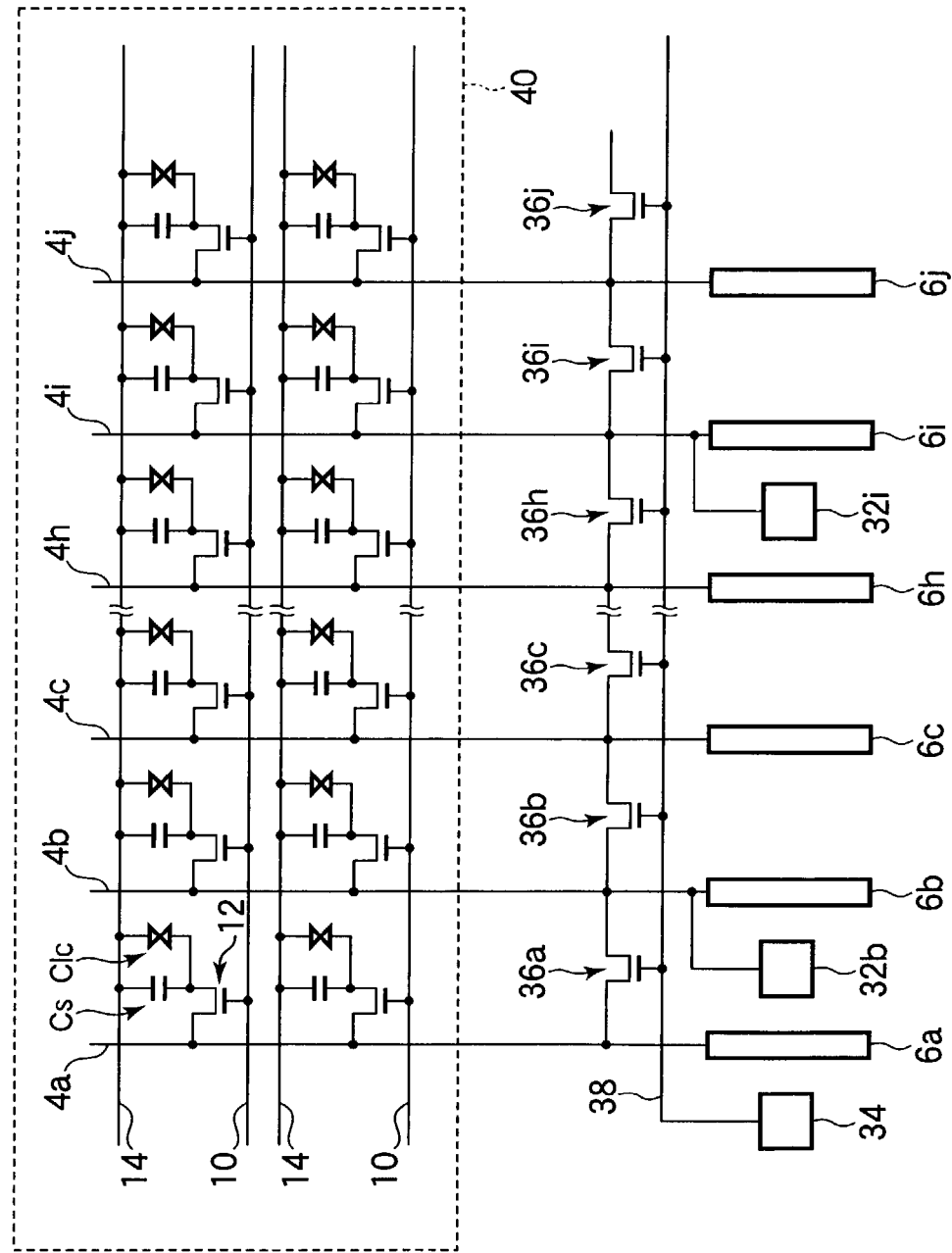
FIG. 4 is a view illustrating an equivalent circuit including the end portion of the substrate for the liquid crystal display device according to the Example 1-1 of the first embodiment of the invention.

FIG. 3 is a view illustrating the constitution of an end portion to which is connected the drain drive circuit 18 on the substrate for the liquid crystal display device according to the embodiment. FIG. 4 is a view illustrating an equivalent circuit inclusive of the above end portion. As shown in FIGS. 3 and 4, end portions 6a to 6i are formed at the ends of the plurality of data bus lines 4a to 4i. Further, pads 32b and 32i for applying a voltage are electrically connected to the data bus lines 4b and 4i for applying a predetermined voltage to the pixel electrodes. The pad 32 for applying a voltage is provided for every predetermined number of data bus lines 4.

The TFT 12 is formed for each pixel in the display region 40. In each pixel, a liquid crystal capacity Clc is formed by the pixel electrode, common electrode (both of which are not shown) and a liquid crystal layer between these electrodes. Further, an auxiliary capacity Cs for holding a potential difference between the pixel electrode and the common electrode, is formed between the storage capacity bus line 14 and an intermediate electrode (not shown) in parallel with the liquid crystal capacity Clc.

Near the end portions 6a to 6i of the data bus lines 4a to 4i, there is formed a first common electrode wiring 38 for polymerization nearly at right angles with the data bus lines 4a to 4i through an insulating film. The common electrode wiring 38 for polymerization is formed simultaneously with the formation of the gate bus lines 10 by using the same material as the gate bus lines 10. A pad 34 for applying a voltage is formed at an end of the common electrode wiring 38 for polymerization. TFTs 36a to 36h for polymerization are formed among the neighboring data bus lines 4a to 4i close to positions where the common electrode wiring 38 for polymerization intersects the data bus lines 4a to 4i. The layers for forming the TFTs 36a to 36h for polymerization are formed simultaneously with the formation of the layers for forming TFTs 12 by using the same layers as those for forming the TFTs 12 on the pixel regions. The source electrodes and drain electrodes of the TFTs 36a to 36h for polymerization are electrically connected to the neighboring data bus lines 4a to 4i, respectively. Further, the gate electrodes of the TFTs 36a to 36h for polymerization are electrically connected to the common electrode wiring 38 for polymerization.

A direct current (DC) voltage applied to the common electrode wiring 38 for polymerization through the pad 34 for applying a voltage, is denoted by Vgc, and a voltage applied to the data bus line 4b through the pad 32b for applying a voltage, is denoted by Vd. The voltage Vd is applied to the drain electrodes of the TFTs 36a and 36b for polymerization arranged on both sides of the data bus line 4b. When the voltage Vgc is greater than the voltage Vd (Vgc>Vd), the TFTs 36a and 36b for polymerization are turned on. Therefore, the voltage Vd is applied to the data bus lines 4a and 4c neighboring the data bus line 4b.

Similarly, even when the voltage Vd is applied to the data bus line 4i through the pad 32i for applying a voltage, the voltage Vd is also applied to the drain electrodes of the neighboring TFTs 32i and 32j for polymerization (TFT 32j for polymerization is not shown). When the voltage Vgc is greater than the voltage Vd (Vgc>Vd), the TFT 36i for polymerization is turned on. Therefore, the voltage Vd is applied to the data bus lines 4h and 4j (data bus line 4j is not shown) neighboring the data bus line 4i. Thus, the voltage Vd applied through the pads 32b and 32i for applying a voltage propagates successively to the neighboring data bus lines 4a to 4i.

In this case, the data bus lines 4a to 4i are connected in series through a resistance R (e.g., not larger than $1 \times 10^7$ Ω) of the TFTs 36a to 36h for polymerization which are being turned on. Accordingly, the speed of propagation of the voltage Vd is determined by the writing characteristics τ of the TFTs 36a to 36h for polymerization. After the passage of a predetermined period of time, the same voltage Vd is applied to all data bus lines 4 on the TFT substrate 2. Therefore, the voltage Vgp which is greater than the voltage Vd (Vgp>Vd) is applied to the gate bus lines 10 to turn on the TFTs 12 of the pixels, so that the voltage Vd is applied to the pixel electrodes 30.

Though not diagramed, the gate bus lines 10 may be constituted in the same manner as the data bus lines 4a to 4i. That is, the first common electrode wiring for polymerization is formed near the terminals of the gate bus lines 10 so as to intersect nearly at right angles with the gate bus lines 10 through an insulating film. The first common electrode wiring for polymerization is formed simultaneously with the formation of the data bus lines 4 by using the same material as the one forming the data bus lines 4. TFTs for polymerization are formed among the neighboring gate bus lines 10 close to positions where the first common electrode wiring for polymerization intersects the gate bus lines 10. The layers forming the TFTs for polymerization are formed simultaneously with the formation of the layers forming the TFTs 12 by using the same material as the one forming the layers of the TFTs 12 in the pixel regions. The source electrodes and drain electrodes of the TFTs for polymerization are electrically connected to the neighboring gate bus lines 10. Further, the gate electrodes of the TFTs for polymerization are electrically connected to the first common electrode wiring for polymerization.

Here, in order to turn on the TFTs for polymerization, a voltage Vgc' greater than the voltage Vgp applied to the gate bus lines 10 (Vgc'>Vgp>Vd) must be applied to the first common electrode wiring for polymerization.

A common voltage Vc is applied to a pad for applying a voltage (not shown) that is electrically connected to the common electrode through a wiring drawn from the CF substrate 8. Therefore, a voltage (|Vc−Vd|) of an absolute value of a difference between the voltage Vc and the voltage Vd is applied to the liquid crystal layer. The liquid crystal layer is irradiated with the UV in a state where a voltage is applied thereto, whereby the monomer in the liquid crystal layer is polymerized to form a polymer structure which imparts a given pre-tilted angle to the liquid crystal molecules. Multiple domains are realized by determining a plurality of pre-tilting directions.

As the monomer necessary for forming the polymer structure, there can be used, for example, a liquid crystalline acrylate monomer (UCL-001) manufactured by Dainippon Ink Co. The monomer is added in an amount of from 0.3 to 3% by weight to the liquid crystal layer. In this state, the liquid crystal layer is irradiated with UV light of a wavelength of 300 to 400 nm with irradiation energy of 1000 to 3000 mJ while being applied with a DC voltage of 3 to 7 V, whereby the monomer is polymerized to form liquid crystal molecules having a given pre-tilted angle. The pre-tilted angle varies depending upon the amount of the monomer that is added, amount of the photo polymerization initiator added to the monomer, amount of irradiation with UV and the applied voltage.

After the product is completed, a voltage Vgc1 smaller than a gray-level voltage Vd1 applied to the data bus lines 4 at the time of really driving the device (Vgc1<Vd1), is applied to the common electrode wiring 38 for polymerization at all times. Then, the TFTs 36 for polymerization are maintained turned off at all times resulting in an increase in the resistance. Accordingly, the data bus lines 4 are electrically isolated from each other. When the TFTs for polymerization and the first common electrode wiring for polymerization same as those for the data bus lines 4, are formed on the side of the gate bus lines 10, a voltage Vgc1' smaller than the gate voltage Vgp1 applied to the gate bus lines 10 at the time of really driving the device (Vgc1'<Vgp1), is applied to the first common electrode wiring for polymerization at all times. Then, the TFTs for polymerization are maintained turned off at all times resulting in an increase in the resistance. Accordingly, the gate bus lines 10 are electrically isolated from each other.

In this embodiment, the pad 32 for applying a voltage is provided in a number of one for every predetermined number of data bus lines 4 (gate bus lines 10). Therefore, it becomes easy to bring the probing pin into contact with each pad 32 for applying a voltage. Further, the bus lines 4 and 10 are electrically isolated from each other since a voltage smaller than a voltage applied to the bus lines 4 and 10, is applied to the common electrode wiring 38 for polymerization at all times. This requires neither the step of cutting the wiring by the irradiation with a laser beam nor the step of secondary scribing, suppressing an increase in the cost of production.

EXAMPLE 1-2

Figure 5:
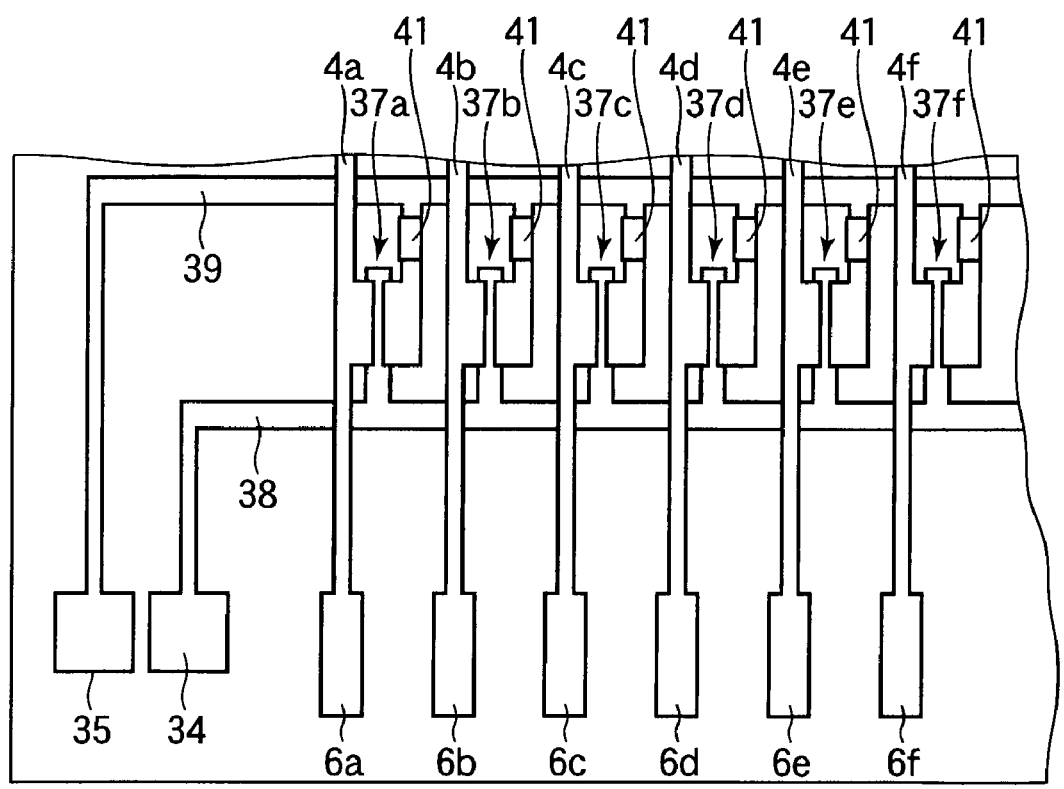
FIG. 5 is a view illustrating the constitution of the end portion of the substrate for the liquid crystal display device according to an Example 1-2 of the first embodiment of the invention.
Figure 6:
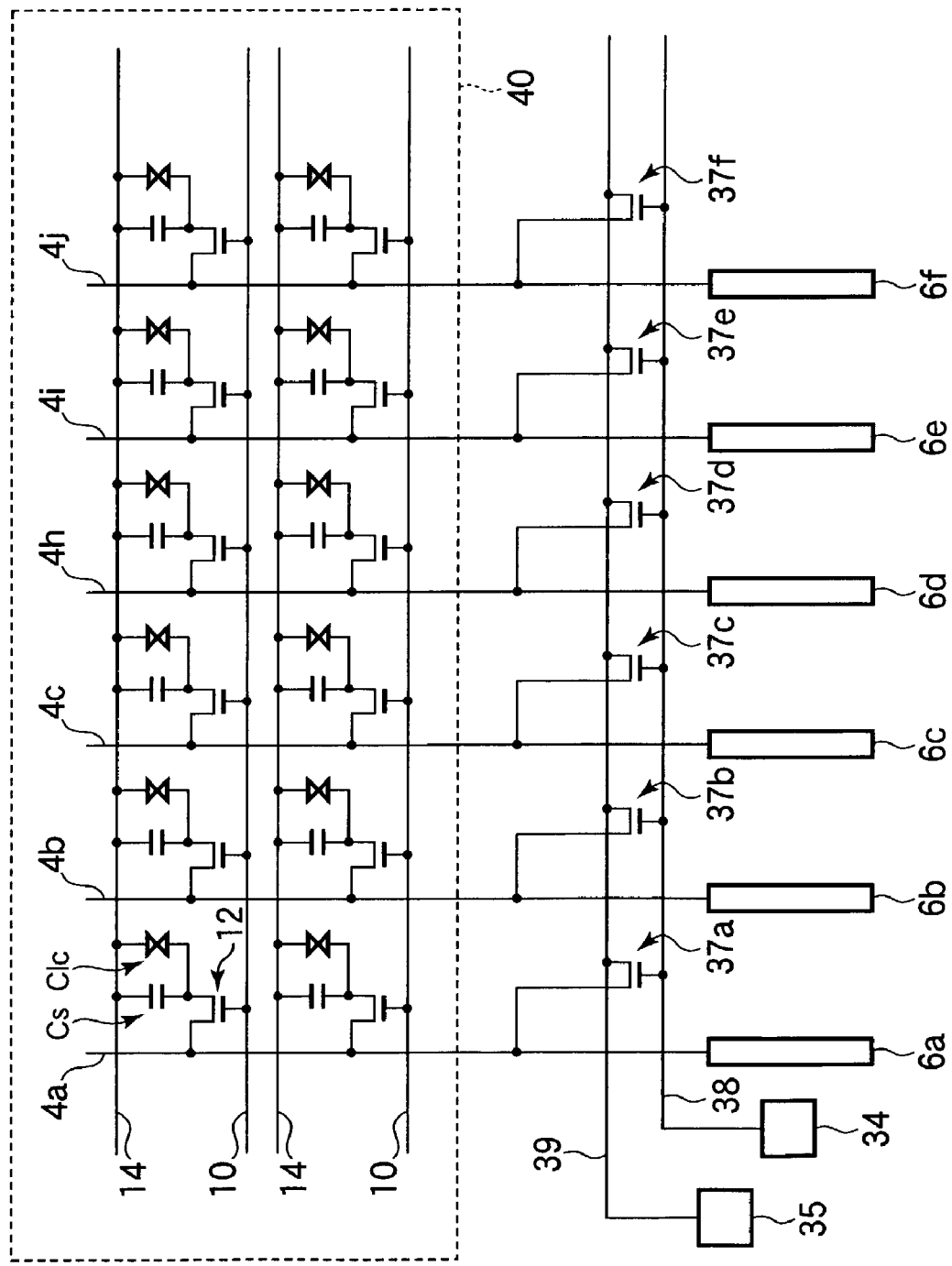
FIG. 6 is a view illustrating an equivalent circuit including the end portion of the substrate for the liquid crystal display device according to the Example 1-2 of the first embodiment of the invention.

Next, the substrate for the liquid crystal display device and the liquid crystal display device equipped therewith according to an Example 1-2 will be described with reference to FIGS. 5 and 6. FIG. 5 is a view illustrating the constitution of an end portion of the substrate for the liquid crystal display device according to this Example, and FIG. 6 is a diagram of an equivalent circuit including the end portion. Constituent elements exhibiting the same functions and actions as those of the Example 1-1 shown in FIGS. 3 and 4, are denoted by the same reference numerals but their description is not repeated.

As shown in FIGS. 5 and 6, near the end portions 6a to 6f of the data bus lines 4a to 4f, there is formed second common electrode wiring 39 for polymerization nearly in parallel with the common electrode wiring 38 for polymerization. The common electrode wiring 39 for polymerization is formed simultaneously with the formation of the gate bus lines 10 by using the same material as that of the gate bus lines 10. A pad 35 for applying voltage is formed at an end of the common electrode wiring 39 for polymerization. TFTs 37a to 37f for polymerization are formed close to positions where the common electrode wiring 38 for polymerization intersects the data bus lines 4a to 4f. The layers for forming the TFTs 37a to 37f for polymerization are formed simultaneously with the formation of the layers for forming TFTs 12 by using the same material as that of the layers forming the TFTs 12 on the pixel regions. The drain electrodes of the TFTs 37a to 37f for polymerization are electrically connected to the common electrode wiring 39 for polymerization through connection portions 41 formed by opening an insulating film that is not shown. The source electrode of the TFT 37a for polymerization is electrically connected to the data bus line 4a. Similarly, the source electrodes of the TFTs 37b to 37f for polymerization are electrically connected to the data bus lines 4b to 4f, respectively.

A voltage applied to the common electrode wiring 38 for polymerization through the pad 34 for applying a voltage, is denoted by Vgc, and a voltage applied to the common electrode wiring 39 for polymerization through the pad 35 for applying a voltage, is denoted by Vd. The voltage Vd is applied to the drain electrodes of the TFTs 37a to 37f for polymerization. When the voltage Vgc is greater than the voltage Vd (Vgc>Vd), the TFTs 37a and 37f for polymerization are turned on. Therefore, the voltage Vd is applied to the data bus lines 4a to 4f electrically connected to the source electrodes of the TFTs 37a to 37f for polymerization.

In this case, the data bus lines 4a to 4f are connected in parallel through a resistance r (e.g., not larger than $1 \times 10^7$ Ω) of the TFTs 36a to 36f for polymerization which are being turned on. Accordingly, the voltage Vd can be applied to the data bus lines 4a to 4f within a period of time shorter than that of the Example 1-1. Thereafter, the voltage Vgp greater than the voltage Vd (Vgp>Vd) is applied to the gate bus lines 10 to turn on the TFTs 12 of the pixels, so that the voltage Vd is applied to the pixel electrodes 30. This Example, too, exhibits the same effect as that of the Example 1-1.

As described above, this Example makes it possible to decrease the cost of production and to obtain a display of good quality.

Second Embodiment

Figure 7:
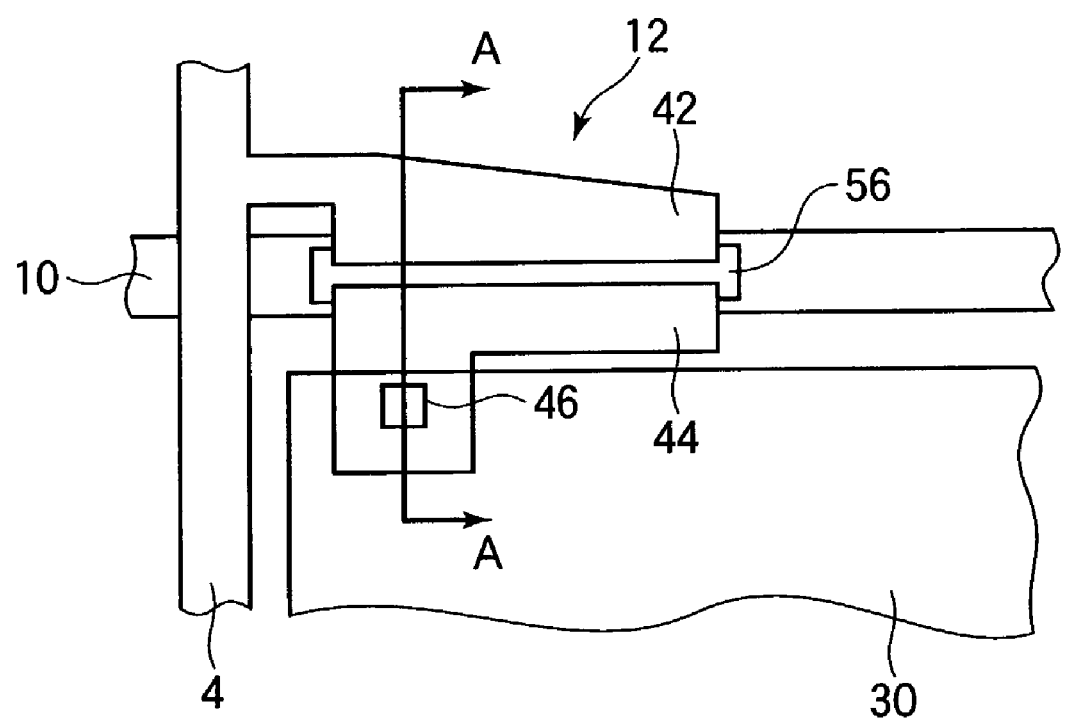
FIG. 7 is a view illustrating the constitution of a TFT on a conventional TFT substrate which serves as a prerequisite for a second embodiment of the invention.

Next, the substrate for the liquid crystal display device and the liquid crystal display device equipped therewith according to a second embodiment will be described with reference to FIGS. 7 to 17C. FIG. 7 is a view illustrating the constitution of a vicinity of the TFT 12 in the conventional TFT substrate 2 which serves as a prerequisite for this embodiment. Referring to FIG. 7, the TFT 12 is formed close to a position at which the gate bus line 10 extending in the right-and-left direction in the drawing intersects nearly at right angles with the data bus line 4 that extends in the up-and-down direction in the drawing through an insulating film that is not shown. The drain electrode 42 of the TFT 12 is drawn from the data bus line 4. An end of the drain electrode 42 is arranged on the side of one end of an operation semiconductor layer 56 formed by using amorphous silicon (a-Si) or the like on the gate bus line 10.

The source electrode 44, on the other hand, is so formed that an end thereof is arranged on the side of the other end of the operation semiconductor layer 56. Being constituted as described above, the gate bus line 10 just under the operation semiconductor layer 56 works as a gate electrode of the TFT 12. Further, the source electrode 44 is connected to a pixel electrode 30 through a contact hole 46.

Figure 8A:
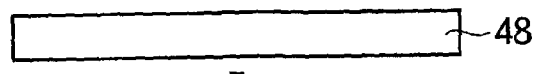
FIGS. 8A to 8H are sectional views illustrating the steps for producing a conventional TFT substrate which serves as a prerequisite for the second embodiment of the invention.
Figure 8B:
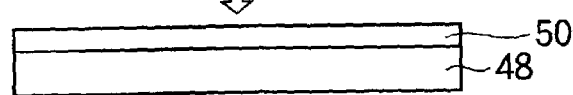
Figure 8C:
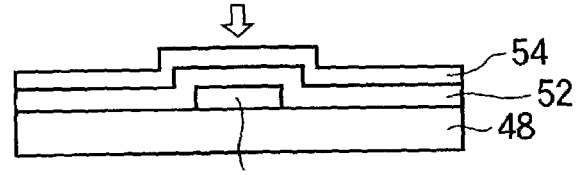

FIGS. 8A to 8H are sectional views illustrating the steps of producing the TFT substrate 2 cut along the line A—A in FIG. 7. Referring, first, to FIG. 8A, a thin AlNd film of a thickness of 200 nm, a thin MoN film of a thickness of 90 nm and a thin Mo film of a thickness of 10 nm are continuously formed by sputtering on a glass substrate 48, thereby to form a metal layer 50 as shown in FIG. 8B. Next, a resist is applied onto the whole surface which is, then, patterned by using a photo mask to form a resist pattern (not shown). Next, as shown in FIG. 8C, wet-etching is effected by using the resist pattern as an etching mask thereby to form a gate bus line 10 (gate electrode). Next, a silicon nitride film (SiNx) of a thickness of 350 nm, an a-Si film of a thickness of 200 nm and an n$^+$a-Si film of a thickness of 30 nm are continuously formed by the CVD method thereby to form an insulating film (gate-insulating film) 52, an a-Si layer 54 and an n$^+$a-Si layer (not shown).

Figure 8D:
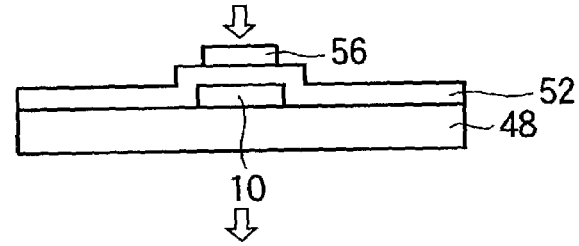

Next, a resist is applied onto the whole surface which is, then, patterned by using a photo mask to thereby form a resist pattern that is not shown. Next, by using the resist pattern as an etching mask, the n$^+$a-Si layer and the a-Si layer 54 are etched to form the operation semiconductor layer 56 as shown in FIG. 8D. Then, the resist pattern is peeled off followed by etching with dilute hydrofluoric acid for about 30 seconds to remove a spontaneously oxidized film from the surface.

Figure 8E:
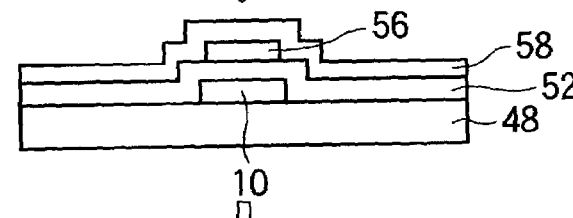
Figure 8F:
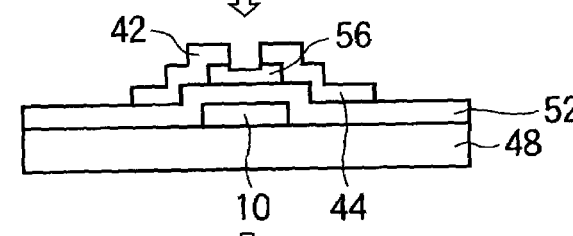

Referring next to FIG. 8E, for example, a thin MoN film of a thickness of 50 nm, a thin Al film of a thickness of 200 nm, a thin MoN film of a thickness of 70 nm and a thin Mo film of a thickness of 10 nm are continuously formed by sputtering thereby to form a metal layer 58. Next, a resist is applied onto the whole surface which is, then, patterned by using a photo mask to form a resist pattern which is not shown. Next, wet-etching is effected by using the resist pattern as an etching mask. Due to this etching, the metal layer 58 having no resist pattern thereon is removed, thereby to form a drain electrode 42 and a source electrode 44 as shown in FIG. 8F. Then, the n$^+$a-Si layer on the channel region is removed by dry-etching. Here, the etching is effected up to the upper surface of the channel region of the operation semiconductor layer 56 in order to etch away the n$^+$a-Si layer on the channel region without leaving residue.

Figure 8G:
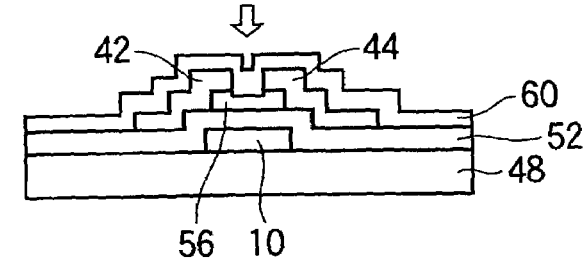

Referring, next, to FIG. 8G, an SiN film having a thickness of 330 nm is formed by the CVD method or the like thereby to form a protection film 60. Next, the resist is applied onto the whole surface which is, then, patterned by using a photomask to form a resist pattern that is not shown. Then, a contact hole 62 is formed by dry-etching by using the resist pattern as an etching mask.

Figure 8H:
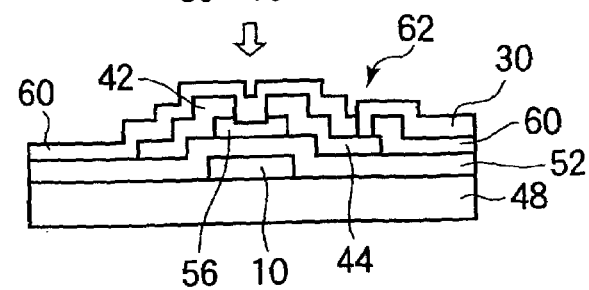

Referring, next, to FIG. 8H, an ITO (indium tin oxide) film having a thickness of, for example, 70 nm is formed by sputtering or the like. Next, the resist is applied to the whole surface which is, then, patterned by using a photomask to form a resist pattern that is not shown. Next, the wet-etching is conducted by using the resist pattern as an etching mask to form a pixel electrode 30. Through the above steps, the TFT substrate 2 is completed.

Figure 9:
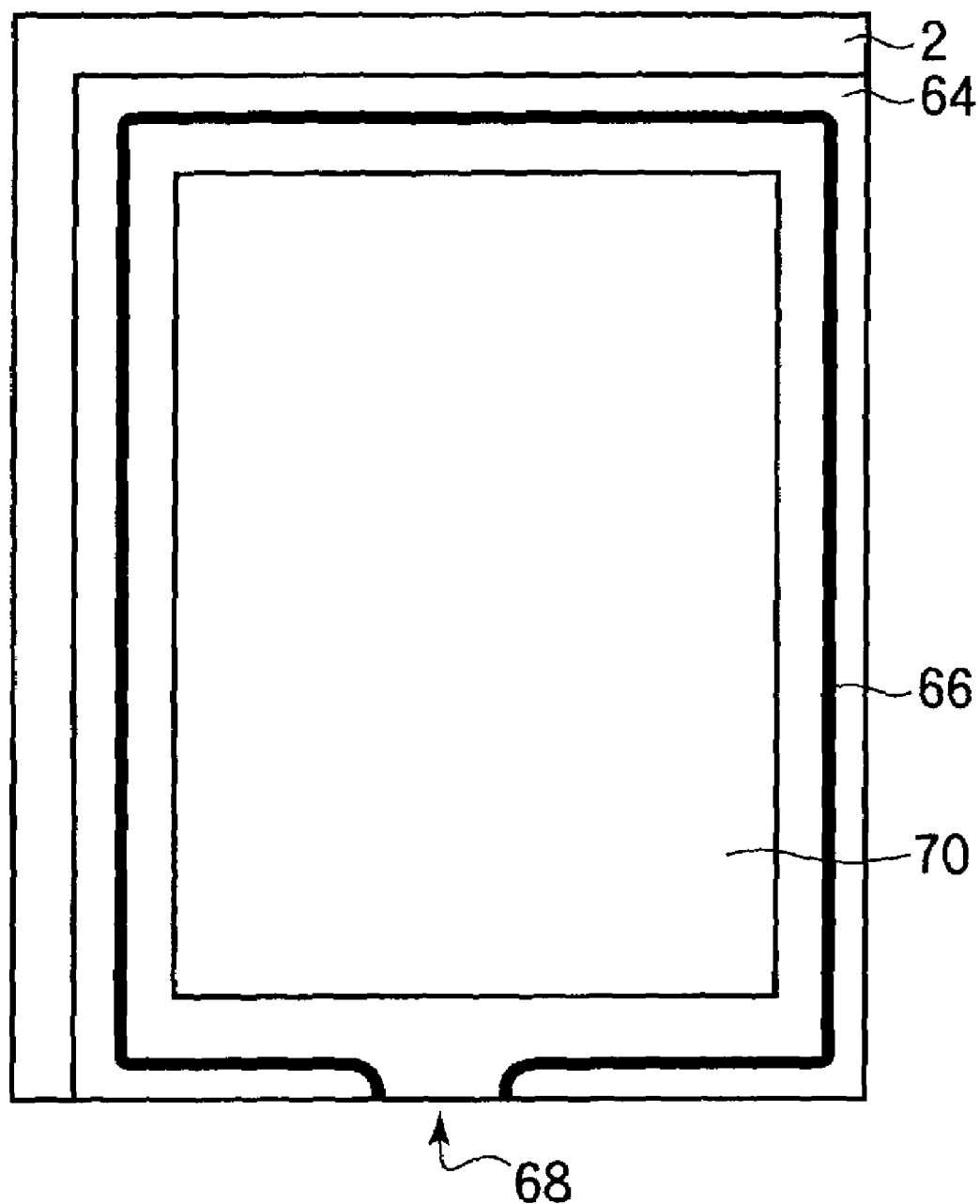
FIG. 9 is a view illustrating a step of pouring liquid crystals into the conventional liquid crystal display device which serves as a prerequisite for the second embodiment of the invention.

Thereafter, the TFT substrate 2 is stuck to the opposing substrate, and liquid crystals are poured into between the two substrates. The liquid crystals can be poured by two methods, i.e., by a dip pouring method and an injection pouring method. First, described below is a step of pouring liquid crystals relying upon the dip pouring method. A sealing material is applied onto the periphery of either the TFT substrate 2 or the CF substrate fabricated according to a predetermined procedure in a manner that a portion thereof is opened as a liquid crystal injection port. The two substrates are then stuck together to fabricate a stuck substrate. FIG. 9 illustrates the constitution of a stuck substrate. As shown in FIG. 9, the TFT substrate 2 and the CF substrate 64 are stuck together via a sealing material 66 applied to the peripheries thereof. A liquid crystal pouring port 68 is formed in one side portion. The liquid crystal pouring port 68 may be formed in the other side portion (inclusive of corner portion).

Next, the stuck substrate and the liquid crystal dish filled with liquid crystals are put into an evacuating device. The interior of the evacuating device is evacuated and, then, the liquid crystal pouring port 68 of the stuck substrate is submerged in the liquid crystals. Next, an inert gas such as nitrogen is poured into the evacuating device, and the gaseous pressure in the evacuating device is raised. Since the interior in the stuck substrate is in a vacuum state, there occurs a pressure differential from the exterior of the stuck substrate. By utilizing this pressure differential and capillary phenomenon, the liquid crystals are drawn into the stuck substrate. In this case, if the interior of the evacuating apparatus is heated at, for example, about 70° C., the liquid crystals exhibit a decreased viscosity and can be poured at an increased rate. After the liquid crystals have been poured, a sealing material may be applied to the liquid crystal pouring port 68 and may be cured by heating or by the irradiation with UV, so that the liquid crystals will not leak out. The step for pouring the liquid crystals relying upon the dip pouring method is thus completed.

Next, described below are the steps for pouring the liquid crystals relying upon the injection pouring method. First, the sealing material 66 is applied to the peripheries of either the TFT substrate 2 or the CF substrate 64 in a manner that two split portions are formed. Then, the two substrates 2 and 64 are stuck together. One split portion is used as an air take-out port for taking out the air from the interior of the stuck substrate, and the other split portion is used as a liquid crystal pouring port 68. Next, nozzles are attached to the air take-out port and to the liquid crystal pouring port 68. The air in the stuck substrate is taken out through the air take-out port to lower the pressure in the stuck substrate, and the liquid crystals are poured through the liquid crystal pouring port 68. After the liquid crystals have been poured, the sealing member is applied onto the air take-out port and onto the liquid crystal pouring port 68, and is cured by heating or by the irradiation with UV, so that the liquid crystals will not leak out. The step for pouring the liquid crystals relying upon the injection pouring method is thus completed.

In recent years, the liquid crystal display devices have been widely used as display devices of personal computers and portable terminals, and have been finding ever increasing demands. Under such circumstances in the market, it has been urged to provide a liquid crystal display device at a low cost yet offering a highly fine display of a high quality. As a liquid crystal display device that features a highly fine display of a high quality, there can be represented a liquid crystal display device of an MVA mode in which liquid crystals having a negatively dielectric anisotropy are vertically aligned and having an alignment regulating structure, such as linear protuberances and slits. However, the liquid crystal display devices of the MVA mode produced relying upon the above two liquid crystal pouring methods tend to develop black shading at the ends of the display region, the black shading being that the display becomes dark when a half tone is displayed, arousing a problem of a decrease in the production yield.

Figure 10:
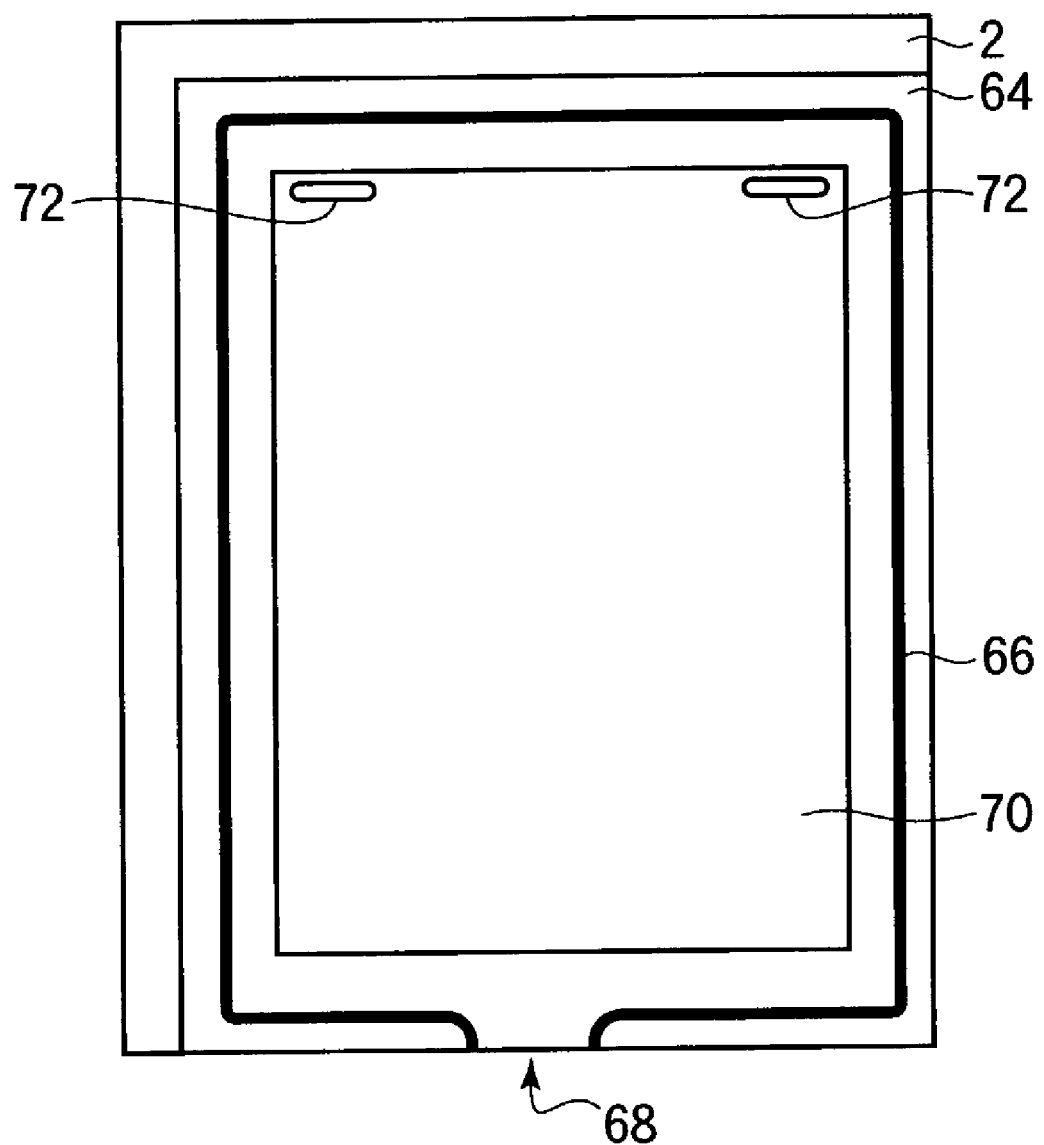
FIG. 10 is a view illustrating a state where black shading is occurring in the conventional liquid crystal display device that serves as a prerequisite for the second embodiment of the invention.

FIG. 10 is a view illustrating a state where the black shading is occurring at the ends of the display region of a conventional liquid crystal display device of the MVA mode. As shown in FIG. 10, the black shading is occurring at two regions 72 along the side facing the side at where the liquid crystal pouring port 68 is formed for the display region 70.

This embodiment is to provide a substrate for a liquid crystal display device and a liquid crystal display device equipped therewith, featuring a favorable quality of display and a high yield of production.

Figure 11:
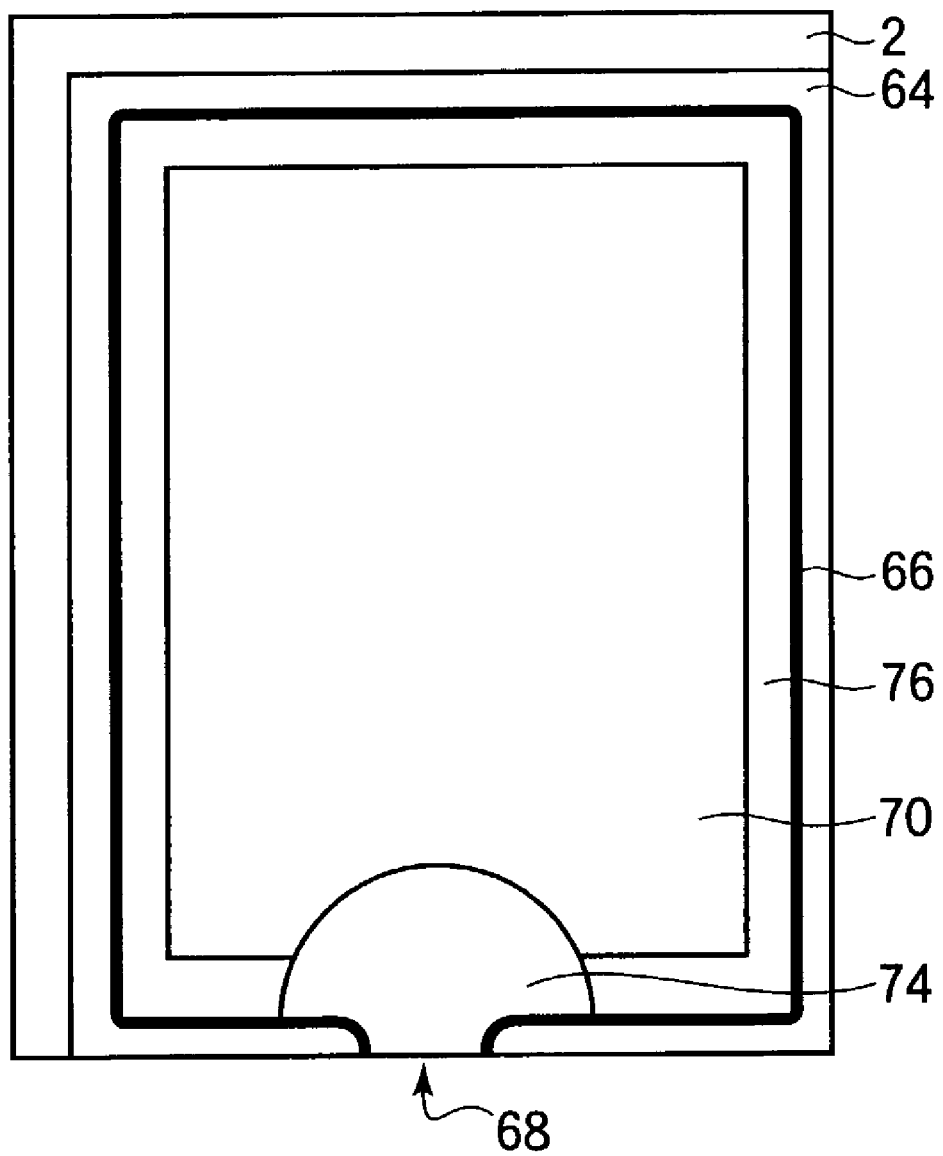
FIG. 11 is a view illustrating a step of pouring the liquid crystals into the conventional liquid crystal display device that serves as a prerequisite for the second embodiment of the invention.
Figure 12:
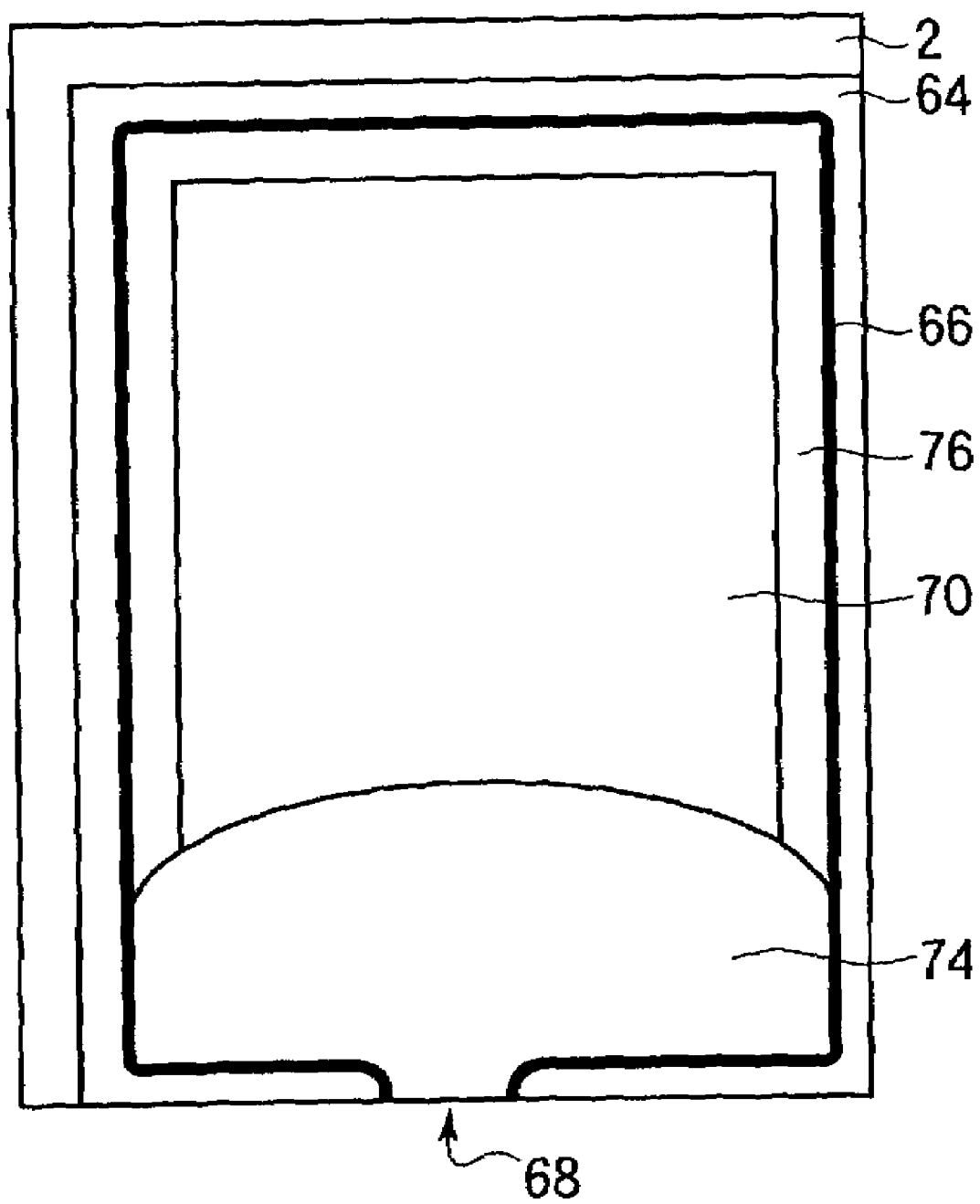
FIG. 12 is a view illustrating a step of pouring the liquid crystals into the conventional liquid crystal display device that serves as a prerequisite for the second embodiment of the invention.
Figure 13:
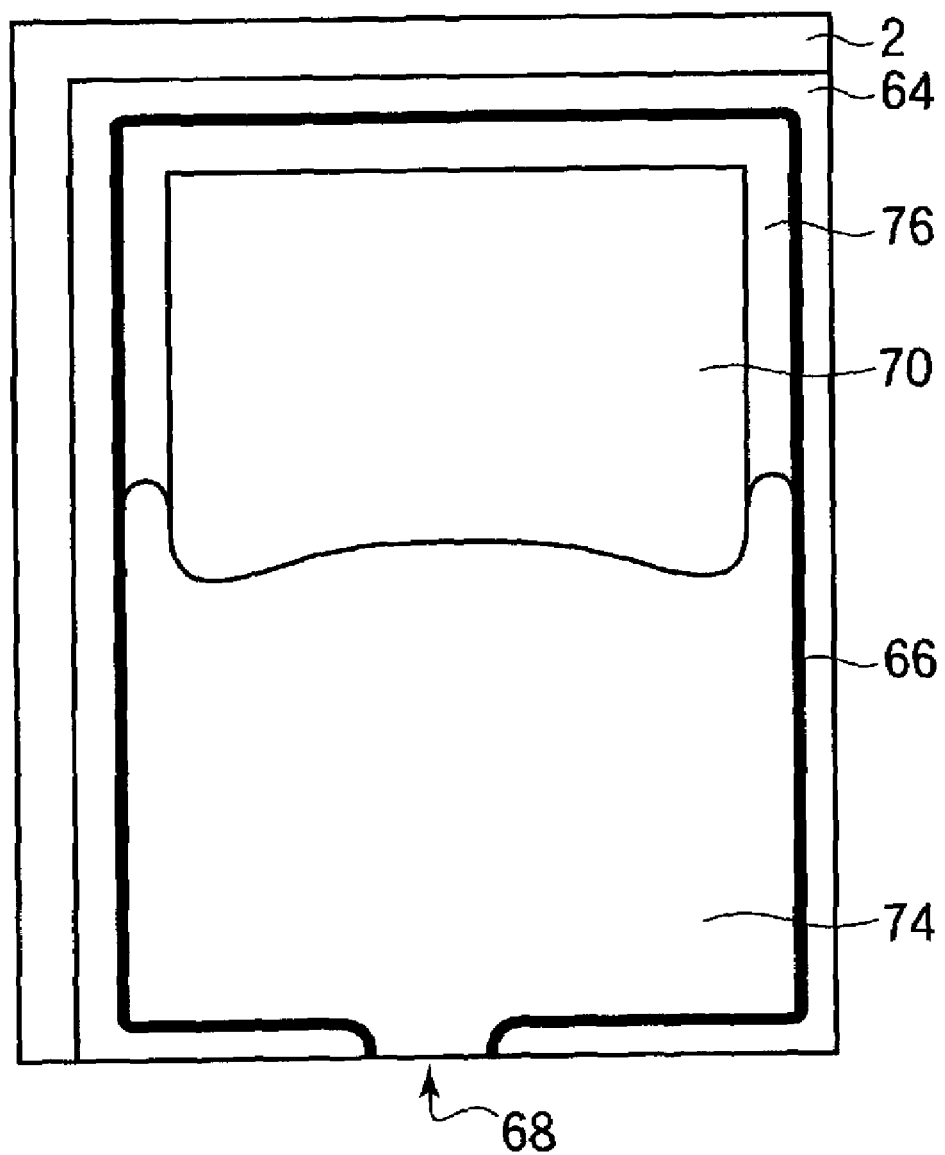
FIG. 13 is a view illustrating a step of pouring the liquid crystals into the conventional liquid crystal display device that serves as a prerequisite for the second embodiment of the invention.

The principle of the embodiment will now be described. FIGS. 11 to 13 illustrate a state where the liquid crystals are being poured into the stuck substrate by the dip pouring. The liquid crystals 74 spread into the stuck substrate from the liquid crystal pouring port 68 as they are poured into the stuck substrate as shown in FIG. 11. Then, as shown in FIG. 12, the liquid crystals 74 proceed up to the sides neighboring the side where the liquid crystal pouring port 68 is formed.

In pouring the liquid crystals 74, the pressure inside the stuck substrate has been decreased to be lower than the pressure outside the stuck substrate to draw the liquid crystals 74. Therefore, the two substrates 2 and 64 are warped to become concave inward, and the cell thickness decreases in the display region 70. In frame regions 76 at the ends of the display region 70, on the other hand, the cell thickness is maintained due to the sealing material 66, and the cell thickness becomes larger than that in the display region 70 at the time of pouring the liquid crystals. As a result, the liquid crystals 74 are poured into the frame regions 76 at a rate larger than a rate at which the liquid crystals 74 are poured into the display region 70. As shown in FIG. 13, therefore, the liquid crystals 74 are poured into the frame regions 76 earlier than into the display region 70, and are poured last into the two regions 72 where black shading occurs as shown in FIG. 10.

It is considered that the black shading occurs due to a drop of retaining the gray level voltage in the pixels as impurities such as lees occurring at the time of printing the alignment film infiltrates into the liquid crystals 74. The impurities tend to collect in the regions 72 (where black shading occurs) to where the liquid crystals 74 are poured last. In the stuck substrate of a structure in which the frame regions 76 have a small cell thickness, it has been known that the degree of black shading can be suppressed. This is presumably due to that since the frame regions 76 have a decreased cell thickness, the liquid crystals 74 are poured at a decreased rate into the frame regions 76, i.e., poured at nearly the same rate at which the liquid crystals 74 are poured into the display region 70. This means that if the stuck substrate has a region to where the liquid crystals 74 are poured at a high rate, impurities are concentrated in this particular region to develop the black shading. If the liquid crystals 74 are poured nearly at the same rate throughout the stuck substrate, the impurities are dispersed and are not collected in a particular region.

The black shading can often be eliminated by circulating the liquid crystals 74 by heating the stuck substrate at a predetermined temperature. However, heating the stuck substrate requires an additional step of production.

In this embodiment, the frame regions 76 are provided with structures for decreasing the rate of pouring the liquid crystals 74 to apparently decrease the cell thickness of the frame regions 76. This lowers the rate of pouring the liquid crystals 74 into the frame regions 76 so as to become nearly equal to the rate of pouring the liquid crystals 74 into the pixel region 70. Thus, the impurities are prevented from being concentrated in the particular regions, and the occurrence of black shading is suppressed.

Hereinafter, a substrate for a liquid crystal display device and a liquid crystal display device equipped therewith will be described more concretely by way of Examples 2-1 to 2-4.

EXAMPLE 2-1

Figure 14A:
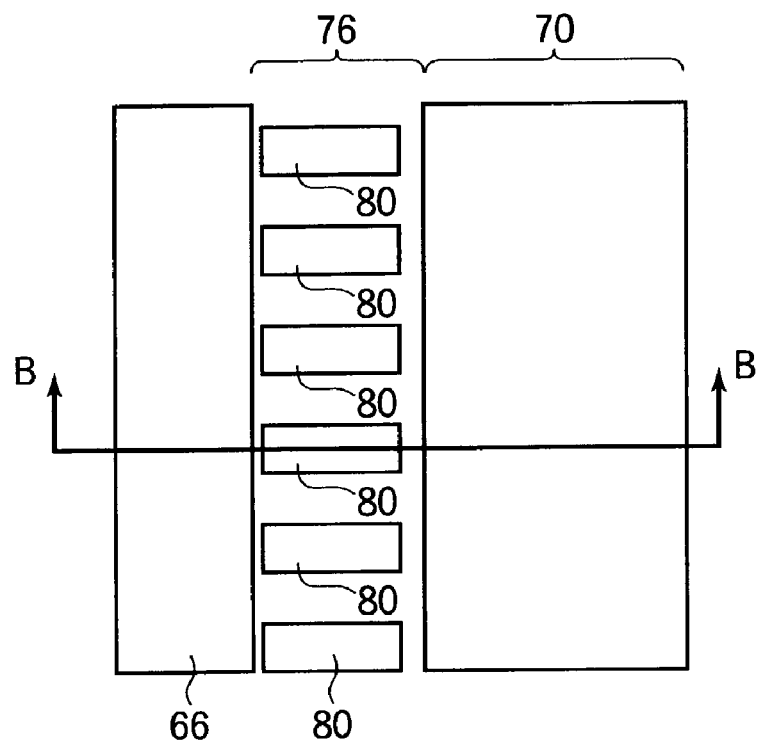
FIGS. 14A and 14B are views illustrating the constitution of the liquid crystal display device according to an Example 2-1 of the second embodiment of the invention.
Figure 14B:
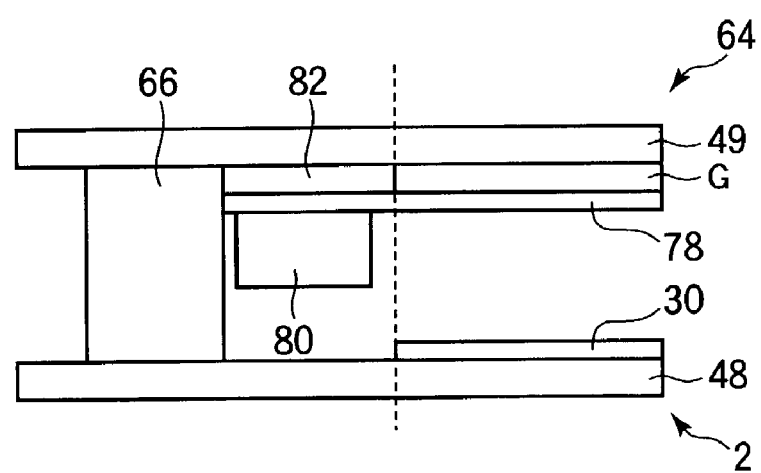

First, the substrate for the liquid crystal display device and the liquid crystal display device equipped therewith according to an Example 2-1 will be described with reference to FIGS. 14A and 14B. FIG. 14A is a view illustrating the constitution of a vicinity of an end of the display region 70 of the liquid crystal display device according to this Example. Though not illustrated, the liquid crystal pouring port 68 is formed in the lower end in the drawing. FIG. 14B is a sectional view schematically illustrating the liquid crystal display device cut along the line B—B in FIG. 14A.

Referring to FIGS. 14A and 14B, the TFT substrate 2 has a pixel electrode 30 formed on a glass substrate 48 for each of the pixels. The CF substrate 64, on the other hand, has a CF resin layer G formed on the display region 70 on a glass substrate 49. The CF substrate 64, further, has a BM 82 formed on the frame region 76. A common electrode 78 is formed on the CF resin layer G and on the BM 82. The TFT substrate 2 and the CF substrate 64 are stuck together through the sealing material 66.

A plurality of structures 80 for decreasing the rate of pouring are formed on the frame regions 76 on the common electrode 78. The structures 80 for decreasing the rate of pouring are formed on the frame regions 76 near the sides neighboring the side where the liquid crystal pouring port 68 is formed. The structures 80 for decreasing the rate of pouring are of a rectangular shape extending in a direction nearly in parallel with the side in which the liquid crystal pouring port 68 is formed as viewed from a direction perpendicular to the surface of the substrate. The structures 80 for decreasing the rate of pouring are formed of, for example, a resist or an acrylic resin or the like. If the CF substrate 64 has, formed thereon, linear protuberances for regulating the alignment or column spacers for holding a cell gap, the structures 80 for decreasing the rate of pouring can be formed by using the same material as them and simultaneously therewith to suppress an increase in the number of the production steps.

The structures 80 for decreasing the rate of pouring are so formed that the gap becomes as small as possible relative to the sealing material 66. The structures 80 for decreasing the rate of pouring may be formed overlapped on the sealing material 66. The length, width and height of the structures 80 for decreasing the rate of pouring, and a gap among them, are determined based upon the rate of pouring the liquid crystals 74 into the display region 70. The rate of pouring the liquid crystals 74 into the display region 70 varies depending upon the presence of the structures for regulating the alignment or the column spacers. Therefore, the structures 80 for decreasing the rate of pouring must be formed to meet various conditions.

According to this Example, the rate of pouring the liquid crystals 74 can be set to be nearly the same between the display region 70 and the frame region 76 to suppress the occurrence of black shading.

EXAMPLE 2-2

Next, the substrate for the liquid crystal display device and the liquid crystal display device equipped therewith according to an Example 2-2 will be described with reference to FIGS. 15A to 15C. FIG. 15A corresponds to FIG. 14A, and is a view illustrating the constitution of a vicinity of an end of the display region 70 of the liquid crystal display device according to this Example. FIG. 15B is a sectional view illustrating the liquid crystal display device cut along the line C—C in FIG. 15A. FIG. 15C is a sectional view illustrating the liquid crystal display device cut along the line D—D in FIG. 15A.

Referring to FIGS. 15A to 15C, structures 86 for decreasing the rate of pouring are formed on the TFT substrate 2. The structures 86 for decreasing the rate of pouring are formed by using, for example, the same material as that of linear protuberances for regulating the alignment formed on the display region 70 of the TFT substrate 2 and simultaneously therewith. The structures 86 for decreasing the rate of pouring formed on the TFT substrate 2 and the structures 80 for decreasing the rate of pouring formed on the CF substrate 64, are alternately arranged as viewed from a direction perpendicular to the surface of the substrate. This Example, too, exhibits the same effect as that of the Example 2-1.

EXAMPLE 2-3

Figure 16A:
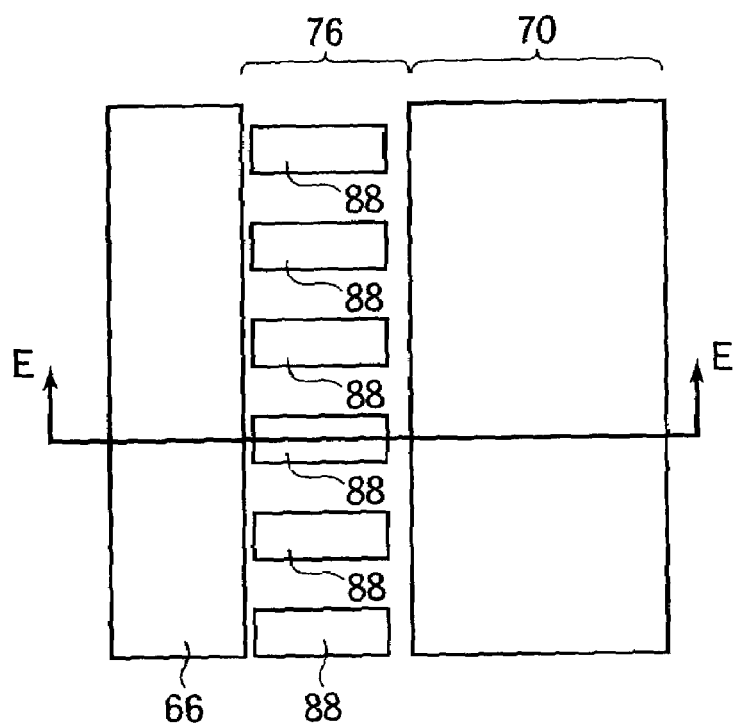
FIGS. 16A and 16B are views illustrating the constitution of the liquid crystal display device according to an Example 2-3 of the second embodiment of the invention.
Figure 16B:
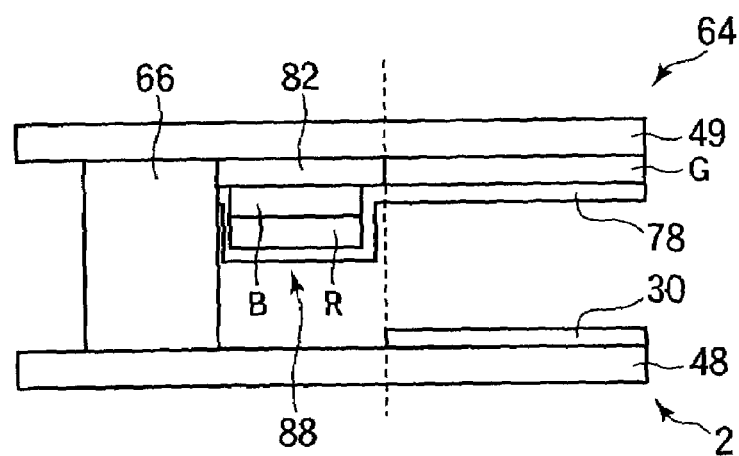

Next, the substrate for the liquid crystal display device and the liquid crystal display device equipped therewith according to an Example 2-3 will be described with reference to FIGS. 16A and 16B. FIG. 16A corresponds to FIG. 14A, and is a view illustrating the constitution of a vicinity of an end of the display region 70 of the liquid crystal display device according to this Example. FIG. 16B is a sectional view illustrating the liquid crystal display device cut along the line E—E in FIG. 16A.

Referring to FIGS. 16A and 16B, structures 88 for decreasing the rate of pouring are formed on the CF substrate 64. The structures 88 for decreasing the rate of pouring are formed by the lamination of CF resin layers B and R formed on the display region 70 of the CF substrate 64 and the common electrode 78. In this Example, the structures 88 for decreasing the rate of pouring are formed by laminating the CF resin layers, but may be formed of the single CF resin layer. This Example, too, exhibits the same effect as that of the Example 2-1.

EXAMPLE 2-4

Figure 17A:
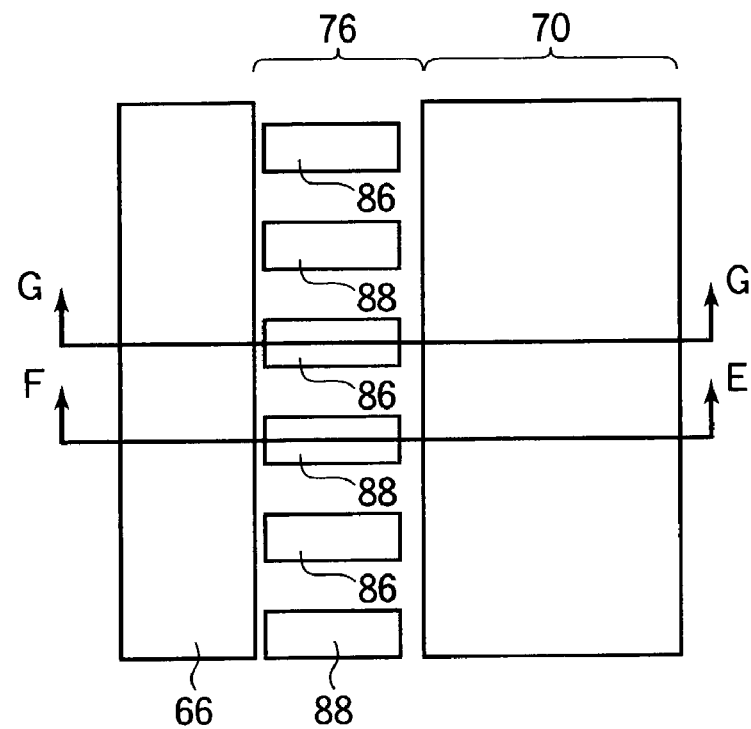
FIGS. 17A to 17C are views illustrating the constitution of the liquid crystal display device according to an Example 2-4 of the second embodiment of the invention.
Figure 17B:
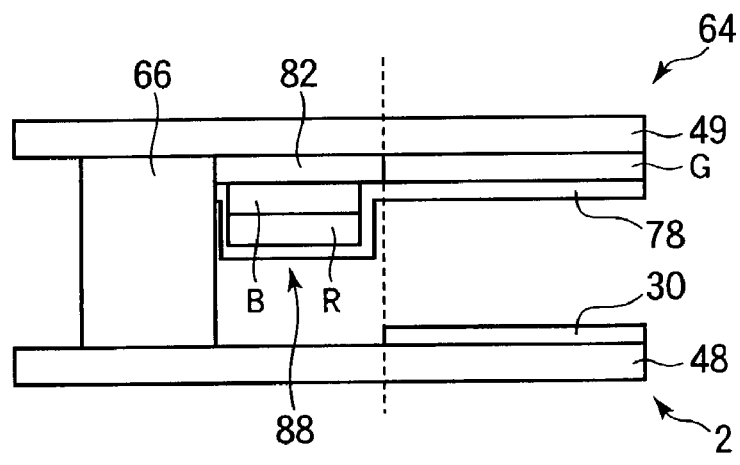
Figure 17C:
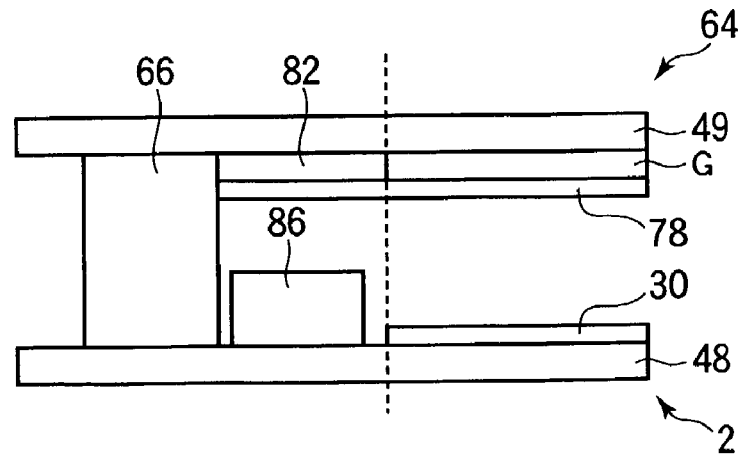
Figure 18:
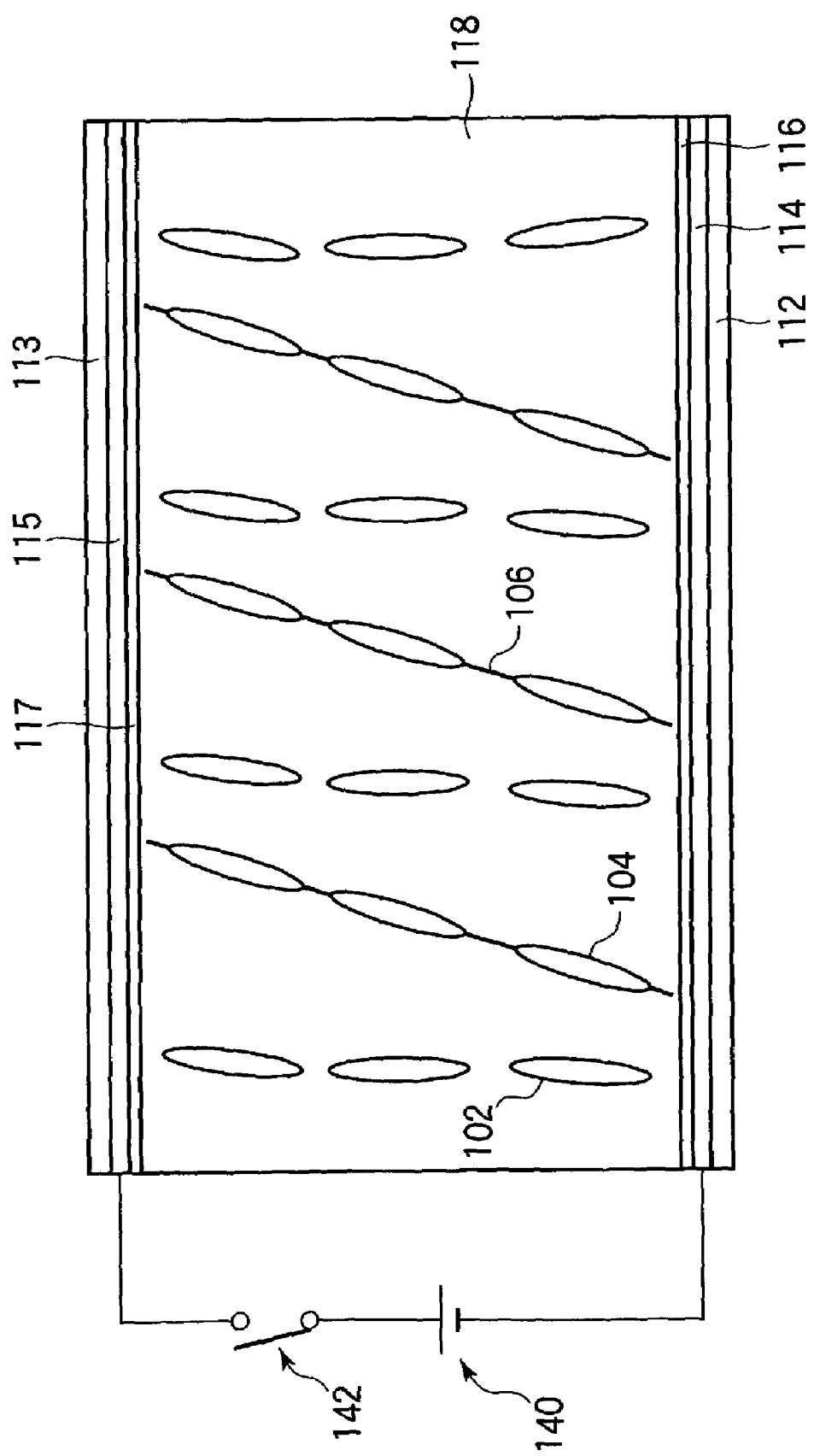
FIG. 18 is a view schematically illustrating a state of a liquid crystal layer in which a monomer is polymerized.
Figure 19:
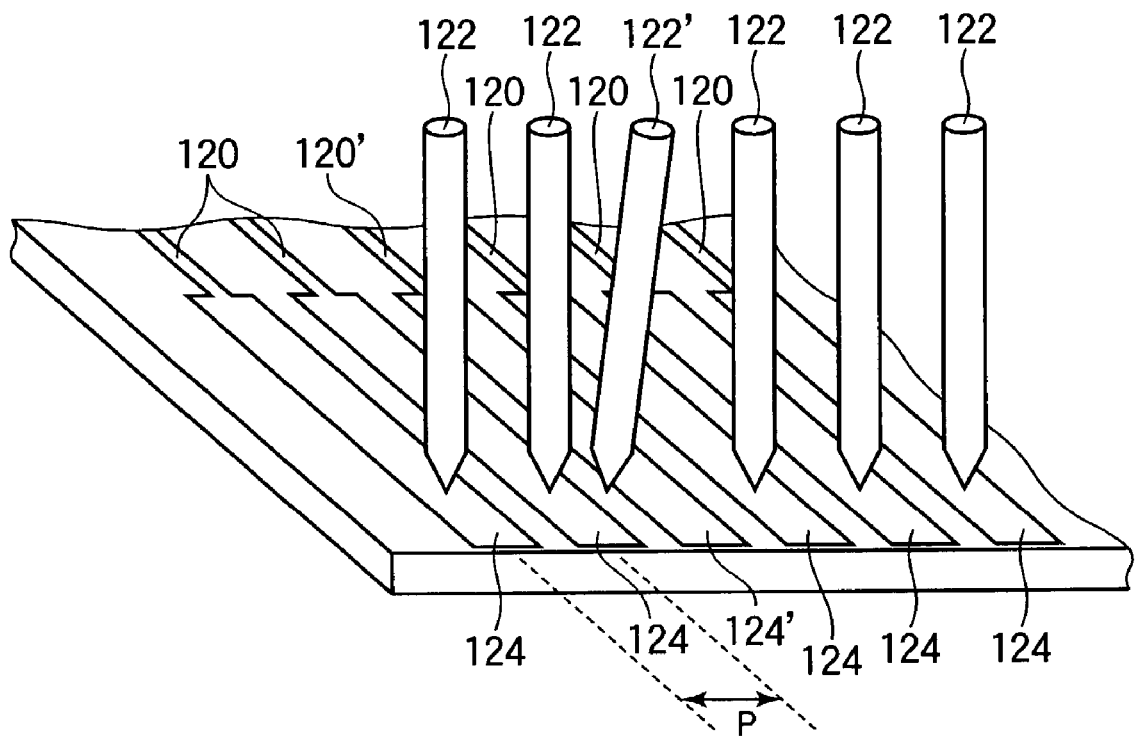
FIG. 19 is a view illustrating a state where a voltage is applied to the bus lines by probing.
Figure 20:
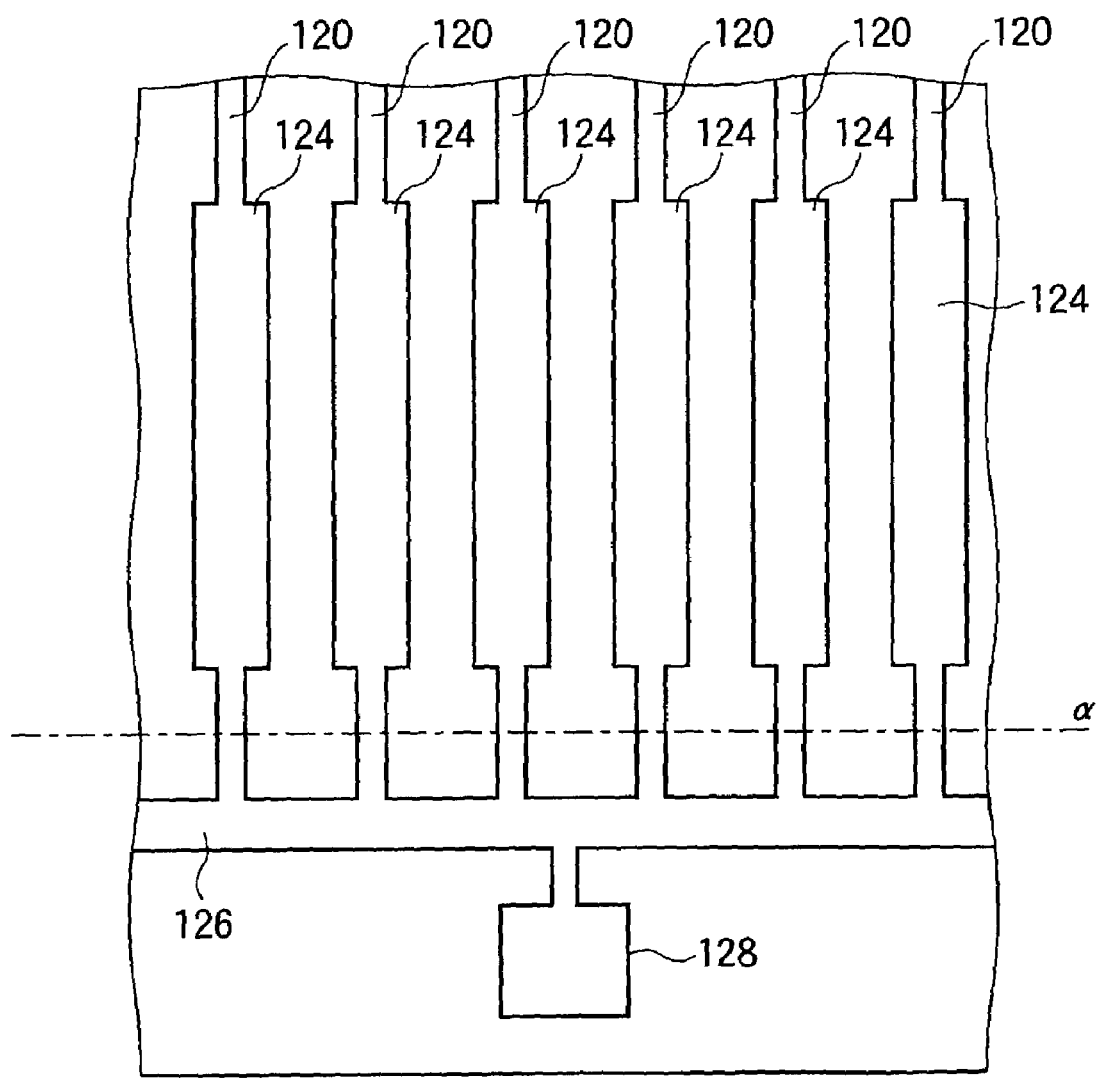
FIG. 20 is a view illustrating the constitution of a peripheral connection line used for applying a voltage.

Next, the substrate for the liquid crystal display device and the liquid crystal display device equipped therewith according to an Example 2-4 will be described with reference to FIGS. 17A to 17C. FIG. 17A corresponds to FIG. 14A, and is a view illustrating the constitution of a vicinity of an end of the display region 70 of the liquid crystal display device according to this Example. FIG. 17B is a sectional view illustrating the liquid crystal display device cut along the line F—F in FIG. 17A. FIG. 17C is a sectional view illustrating the liquid crystal display device cut along the line G—G in FIG. 17A.

Referring to FIGS. 17A to 17C, structures 88 for decreasing the rate of pouring are formed on the CF substrate 64, and structures 86 for decreasing the rate of pouring are formed on the TFT substrate 2. The structures 86 for decreasing the rate of pouring and the structures 88 for decreasing the rate of pouring, are alternately arranged as viewed from a direction perpendicular to the surface of the substrate. This Example, too, exhibits the same effect as that of the Example 2-1.

As described above, this embodiment makes it possible to obtain a display of good quality and to improve the yield of production.

This invention can be modified in a variety of ways not being limited to the above embodiments only.

In the above first embodiment, a plurality of bus lines were electrically connected by using the TFTs for polymerization only when the liquid crystal layer was to be polymerization-fixed. The invention, however, is in no way limited thereto only, and non-linear elements such as diodes may be used instead of the TFTs for polymerization.

According to this invention as described above, it is allowed to realize a substrate for a liquid crystal display device and a liquid crystal display device equipped therewith, at a decreased cost offering a display of good quality.

What is claimed is:

1. A substrate for a liquid crystal display device comprising:
    a holding substrate for holding a liquid crystal composition obtained by mixing a monomer into liquid crystals with an opposite substrate;
    a plurality of bus lines formed on the holding substrate in a manner of intersecting each other through an insulating film;
    a pixel electrode formed for each of several pixel regions sectionalized by the plurality of bus lines;
    a plurality of first thin-film transistors formed close to positions where the plurality of bus lines intersect each other;
    a plurality of second thin-film transistors for applying a voltage to the pixel electrodes for polymerizing the monomer;
    a first common electrode wiring electrically connected to the gate electrodes of the plurality of second thin-film transistors for applying a gate voltage for enabling the second thin-film transistors to apply the voltage to the pixel electrodes; and
    a pad for applying the gate voltage to the first common electrode wiring.

2. A substrate for a liquid crystal display device according to claim 1, wherein the plurality of bus lines are connected to each other through the second thin-film transistors for polymerization.

3. A substrate for a liquid crystal display device according to claim 1, further comprising a second common electrode wiring for polymerization electrically connected to the drain electrodes of the plurality of second thin-film transistors for polymerization, the plurality of bus lines being electrically connected to the source electrodes of the neighboring second thin-film transistors for polymerization.

4. A substrate for a liquid crystal display device according to claim 1, wherein the layers forming the second thin-film transistors for polymerization are made of the same material as the one forming the layers of the first thin-film transistors.

5. A liquid crystal display device comprising:
    two pieces of substrates arranged being opposed to each other; and liquid crystals sealed between the two pieces of substrates,
wherein at least either one of the two pieces of substrates is the one for a liquid crystal display device according to claim 1.

6. A liquid crystal display device according to claim 5, wherein the liquid crystals have negative dielectric anisotropy.

* * * * *

UNITED STATES PATENT AND TRADEMARK OFFICE
CERTIFICATE OF CORRECTION

PATENT NO. : 7,245,329 B2
APPLICATION NO. : 10/310125
DATED : July 17, 2007
INVENTOR(S) : Tanaka et al.

It is certified that error appears in the above-identified patent and that said Letters Patent is hereby corrected as shown below:

On the Title Page:

Item [75] Under Inventors, delete "Tomoyuki Miyata"

Signed and Sealed this

Twentieth Day of November, 2007

JON W. DUDAS
*Director of the United States Patent and Trademark Office*